United States Patent
Yoshida

(10) Patent No.: US 7,430,288 B2
(45) Date of Patent: Sep. 30, 2008

(54) EXCHANGE AND CONFERENCE COMMUNICATION METHOD THEREFOR

(75) Inventor: Masanobu Yoshida, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 460 days.

(21) Appl. No.: 10/553,839

(22) PCT Filed: Feb. 25, 2005

(86) PCT No.: PCT/JP2005/003665

§ 371 (c)(1),
(2), (4) Date: Oct. 20, 2005

(87) PCT Pub. No.: WO2005/084042

PCT Pub. Date: Sep. 9, 2005

(65) Prior Publication Data

US 2006/0215584 A1 Sep. 28, 2006

(30) Foreign Application Priority Data

Feb. 26, 2004 (JP) .............................. 2004-051102
Feb. 20, 2005 (JP) .............................. 2005-041992

(51) Int. Cl.
*H04M 1/00* (2006.01)
*H04M 3/42* (2006.01)

(52) U.S. Cl. ............. 379/158; 379/202.01; 379/205.01; 379/506.01; 370/260; 370/263

(58) Field of Classification Search ................. 379/156, 379/158, 165–166, 202.01, 204.01, 205.01; 370/260–261, 263–265
See application file for complete search history.

(56) References Cited

U.S. PATENT DOCUMENTS 4,964,157 A 10/1990 Aoshima
(Continued)

FOREIGN PATENT DOCUMENTS

JP 2000/36873 2/2000

OTHER PUBLICATIONS

PCT International Search Report dated May. 20, 2005.

*Primary Examiner*—Binh K Tieu
(74) *Attorney, Agent, or Firm*—Dickinson Wright, PLLC

(57) ABSTRACT

An exchange capable of increasing the number of participants in a conference without increasing conference circuits for conference communications. The exchange (2) switches connections either between a line wire (11) and a plurality of extensions (10a) to (10c) or between plural extensions and plural line wires. The exchange (2) comprises: a memory (27) registered with plural telephone numbers grouped; and a controller (26) which is notified of a demand of the conference communications from an extension telephone (3a) connected with the extensions (10a) to (10c), for acquiring other telephone numbers of the same group of the telephone number of the extension telephone (3a) thereby to form a channel for unidirectional communications, and which is notified of a demand from the extension telephone (3a) for bidirectional communications with the telephone selected from the other telephones in the unidirectional communications, for forming a channel so that the unidirectional communications with the telephone of the selected telephone number may be the bidirectional communications.

22 Claims, 16 Drawing Sheets

U.S. PATENT DOCUMENTS 5,442,622 A * 8/1995 Hokari ........................ 370/217
5,737,390 A * 4/1998 Mano ........................ 379/9.02
5,815,817 A     9/1998 Suzuki
6,208,639 B1 * 3/2001 Murai ........................ 370/356
6,563,817 B1 * 5/2003 Murai ........................ 370/356

* cited by examiner

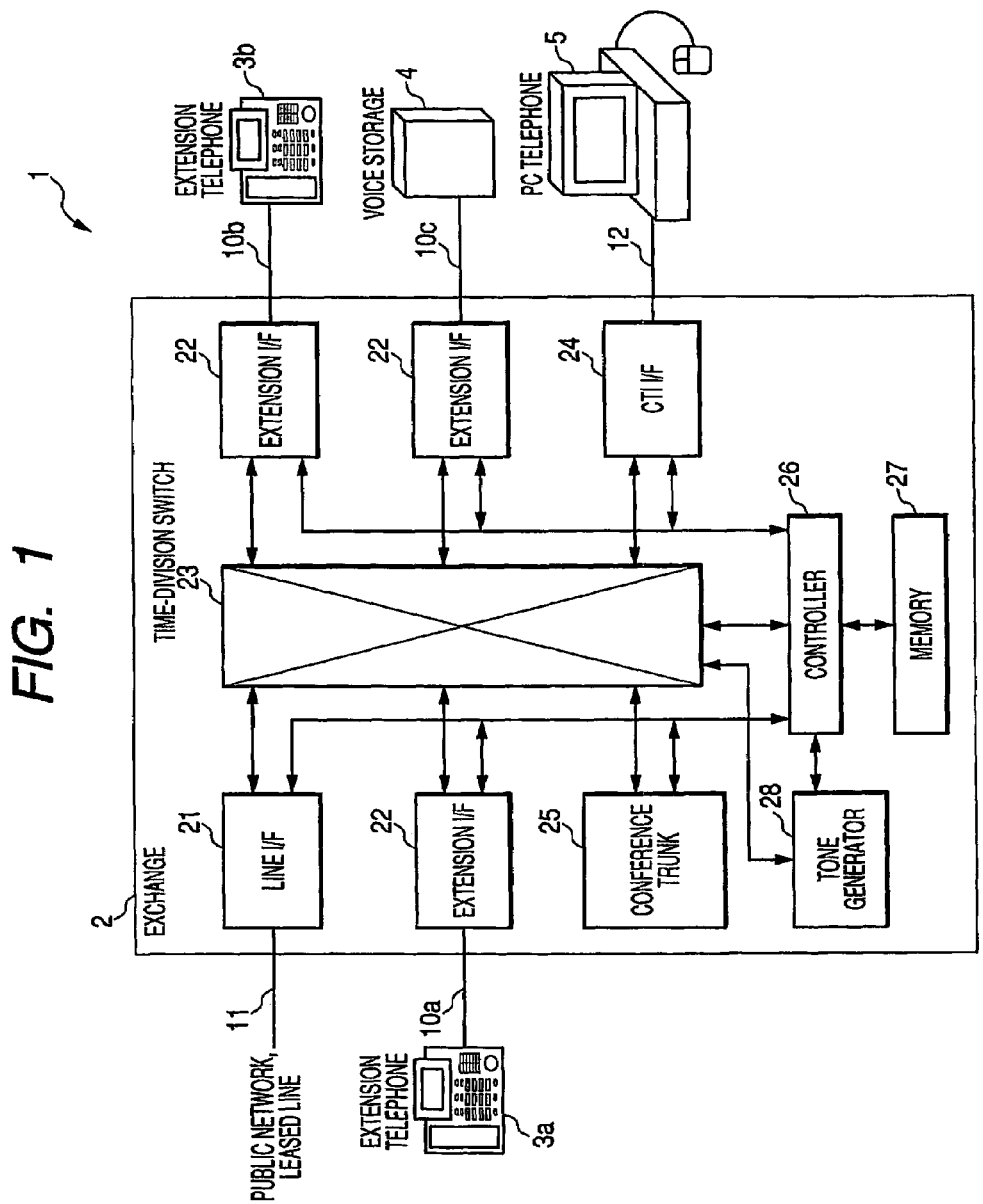

FIG. 2(a)

| GROUP NO. | GROUP NAME | MEMBER 1 | MEMBER 2 | MEMBER 3 | ... | MEMBER n |
|---|---|---|---|---|---|---|
| 1 | GROUP-A | EXTENSION 102 | LINE WIRE 0120-1234-5678 | EXTENSION 107 | ·· | |
| ·· | ·· | ·· | ·· | ·· | | |
| M | ·· | ·· | ·· | ·· | | |

FIG. 2(b)

| NO. | TEL. NO. | USER'S NAME |
|---|---|---|
| 1 | EXTENSION 102 | H.FUKUDA |
| 2 | EXTENSION 107 | Y.TATUMI |
| 3 | EXTENSION 202 | VOICE MAIL |
| ·· | ·· | ·· |
| X | ·· | ·· |

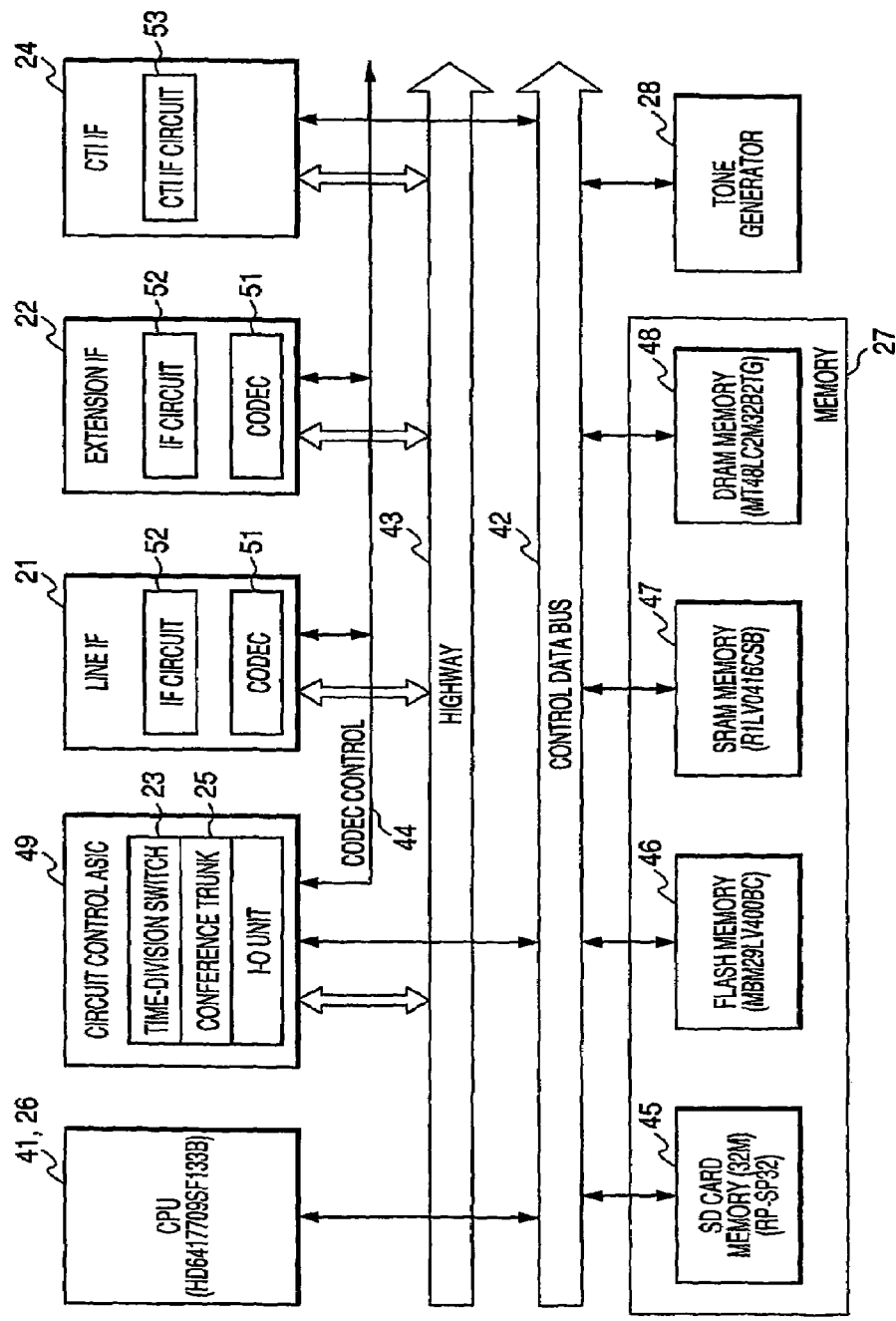

FIG. 13(a)

[DISPLAY OF PROMOTER'S TELEPHONE]

1. EXT 102 : H.Fukuda
→ 2. EXT 107 : Y.Tatsumi
3. CO 001 : 0120-1234-5678
4. EXT 202 : Voice Mail
5. CO 028 : 03-9876-5432

[ DISC ]

⇔ SECRET COMMUNICATIONS STATE DISPLAY

FIG. 13(b)

[DISPLAY OF PARTICIPANT'S TELEPHONE]

Multi Conference

EXT 101 : Operator

⇔ SECRET COMMUNICATIONS STATE DISPLAY (SIMILAR BIDIRECTIONAL COMMUNICATIONS TIME)

United States Patent No. US 7,430,288 B2

EXCHANGE AND CONFERENCE COMMUNICATION METHOD THEREFOR

FIELD OF THE INVENTION

The present invention relates to an exchange capable of performing conference communications with plural extension telephones and, more particularly, to an exchange capable of increasing the number of participants in a conference and changing the communication modes of the conference.

BACKGROUND INFORMATION

An exchange used in the conference system of the prior art includes register means for registering the calling numbers of plural telephones as one group from the outside so that all the telephones can communicate by calling all the telephones belonging to the group in response to the call of a special number from the telephone of one calling number belonging to that group (as referred to JP-A-2000-36873).

This conference system exchange, as disclosed in Patent Publication 1, is provided with registration means capable of registering the calling numbers of the telephones belonging to the group from the outside so that the participants of the conference can be freely set.

SUMMARY OF THE INVENTION

In the exchange of the exchange system disclosed in Patent Publication 1, however, all the telephones belonging to the group can communicate with each other. In order to synthesize the voices of the individual communications, therefore, it is necessary to prepare the conference circuits in the number of lines belonging to that group. As a result, the scale of the conference circuit is enlarged to raise the cost for the exchange.

An object of the invention is to provide an exchange capable of increasing the number of participants in a conference without increasing conference circuits for conference communications.

According to the invention, there is provided an exchange including a plurality of line interfaces to be connected with a line wire, and one or more extension interfaces to be connected with an extension, for connecting either the line wire and the extension or the extension and another extension, thereby to form a channel, comprising: a time-division switch for connecting the line wire and the extension and for forming a channel between each other; a memory for grouping at least two telephone numbers of the extension number assigned to the extension and the telephone number of the line wire, into at least one group and for registering the group; and a controller for controlling the exchanging action either between the line wire and the extension or between the extensions, wherein when the controller receives a conference opening demand for the conference communications via a first extension and the group number, the controller: performs a conference calling termination by acquiring the number of other extensions belonging to the same group as that of the first extension having demanded the conference communications, from the memory; and controls the time-division switch so as to establish unidirectional communications from the first extension to the other extensions responding to the conference calling termination, wherein the exchange further comprises a conference trunk for synthesizing voices, and wherein the controller further controls, when it receives a demand for bidirectional communications from any extension for the unidirectional communications, the time-division switch so that the extension having demanded the bidirectional communications and the first extension may make bidirectional communications.

In the exchange of the invention described above, the communications from the telephone demanded the conference communications are made unidirectional with the telephone having the other telephone number of the group, to which the demanding telephone number belongs, and this unidirectional communications with the telephone having the selected telephone number are made bidirectional by demanding the bidirectional communications with the telephone which has been selected from the other telephones in the unidirectional communications.

As a result, the number of lines for the bidirectional communications can be determined on the side of the telephone having demanded the conference communications so that the number of lines for the bidirectional communications to be used for the conference communications can be reduced to the necessary minimum. Therefore, the conference circuits can be reduced, and the plural groups can make the conference communications simultaneously.

In order to solve the aforementioned problems, according to a first aspect of the invention, there is provided an exchange including a plurality of line interfaces to be connected with a line wire, and one or more extension interfaces to be connected with an extension, for connecting either the line wire and the extension or the extension and another extension, thereby to form a channel, comprising: a time-division switch for connecting the line wire and the extension and for forming a channel between each other; a memory for grouping at least two telephone numbers of the extension number assigned to the extension and the telephone number of the line wire, into at least one group and for registering the group; and a controller for controlling the exchanging action either between the line wire and the extension or between the extensions, wherein when the controller receives a conference opening demand for the conference communications via a first extension and a group number, the controller: performs a conference calling termination by acquiring the number of other extensions belonging to the same group as that of the first extension having demanded the conference communications, from the memory; and controls the time-division switch so as to establish unidirectional communications from the first extension to the other extensions responding to the conference calling termination.

As a result, in response to the notification from the extension telephone demanding the conference communications, the exchange makes terminations all at once at the extensions or line wires of the participants with reference to the group setting information registered in the memory (in the case of the partner on the line wire, the exchange transmits the telephone number from the line interface to the line wire and terminates via the public network or the leased line), and the communications with the responding partner (e.g., the extension telephone or the telephone of the line wire) are made unidirectional, so that the conference can be held without any conference trunk.

In order to solve the aforementioned problems, according to a second aspect of the invention, there is provided an exchange including a plurality of line interfaces to be connected with a line wire, and one or more extension interfaces to be connected with an extension, for connecting either the line wire and the extension or the extension and another extension, thereby to form a channel, comprising: a time-division switch for connecting the line wire and the extension and for forming a channel between each other; a conference trunk for synthesizing voices; a memory for grouping at least two telephone numbers of the extension number assigned to the extension and the telephone number of the line wire, into at least one group and for registering the group; and a controller for controlling the exchanging action either between the line wire and the extension or between the extensions, wherein when the controller receives a conference opening demand together with a group number via a first extension, the controller: performs a conference calling termination by acquiring the number of other extensions belonging to the same group as that of the first extension having demanded the conference communications, from the memory; and controls the time-division switch so as to establish unidirectional communications from the first extension to the other extensions responding to the conference calling termination, and wherein the controller further controls, when it receives a demand for bidirectional communications from any extension for the unidirectional communications, the time-division switch so that the extension having demanded the bidirectional communications and the first extension may make bidirectional communications. There is also provided a conference communication method for the exchange.

As a result, the number of lines for the bidirectional communications can be determined from the side of the telephone having demanded the conference communications so that the number of the lines for the bidirectional communications to be used for the conference communications can be reduced to the necessary minimum. Therefore, the number of conferences can be reduced. Moreover, the bidirectional communications can be made by transmitting the demand for the bidirectional communications from the side of the telephone having the other telephone number of the same group as that of the telephone number of the telephone having demanded the conference communications. In the exchange, moreover, the channel is formed such that the bidirectional communications with the selected telephone are made into the unidirectional communications by notifying the demand for the unidirectional communications with the telephone selected from the telephones with the bidirectional communications with the telephone having demanded the conference communications. As a result, the communications with the line wire partner or the extension telephone in the bidirectional communications can be returned to the unidirectional communications from the side of the telephone having demanded the conference communications.

In order to solve the aforementioned problems, according to a third aspect of the invention, there is provided an exchange including a plurality of line interfaces to be connected with a line wire, and one or more extension interfaces to be connected with an extension, for connecting either the line wire and the extension or the extension and another extension, thereby to form a channel, comprising: a time-division switch for connecting the line wire and the extension and for forming a channel between each other; a conference trunk for synthesizing voices; a memory for grouping at least two telephone numbers of the extension number assigned to the extension and the telephone number of the line wire, into at least one group and for registering the group; and a controller for controlling the exchanging action either between the line wire and the extension or between the extensions, wherein when the controller receives a conference opening demand together with a group number via a first extension, the controller: performs a conference calling termination by acquiring the number of other extensions belonging to the same group as that of the first extension having demanded the conference communications, from the memory; and controls the time-division switch so as to establish unidirectional communications from the first extension to the other extensions responding to the conference calling termination, wherein the controller controls, when it receives a demand for bidirectional communications from any extension for the unidirectional communications, the time-division switch and the conference trunk so that the extension having demanded the bidirectional communications and the first extension may make bidirectional communications, and wherein in the bidirectional communications among three or more of the first extension and the other extensions, the controller controls, when it selects the extension for a secret from the extensions of the bidirectional communications and receives a secret communication demand via the first extension, the time-division switch for the secret communications so that only the extension selected and the first extension.

As a result, the telephone of another telephone number of the same group can be selected from the side of the telephone having demanded the secret communications thereby to perform the individual one-to-one secret communications can be done in the bidirectional conference communications.

During the secret communications, moreover, the standby participant not participating in the secret communications is connected with the standby holding sound source or the standby voice message source of the tone generator so that the participant can hear the standby holding sound source or the voice message urging the standby. Moreover, the conference trunk is controlled to realize the bidirectional communications between all the members not participating in the secret communications. It is further possible to transfer the communications easily from the bidirectional ones to the secret ones or vice versa.

BRIEF DESCRIPTION OF THE DRAWINGS

FIG. 1 is a diagram for explaining a conference system using an exchange according to an embodiment of the invention;

FIG. 2 presents diagrams for explaining the contents of a memory of FIG. 1;

FIG. 3 is a configuration diagram of a hardware of the exchange of FIG. 1;

FIG. 13 presents diagrams showing display examples of secret communications in the display panel of the extension telephone;

BEST MODE FOR CARRYING OUT THE INVENTION

Figure 4:
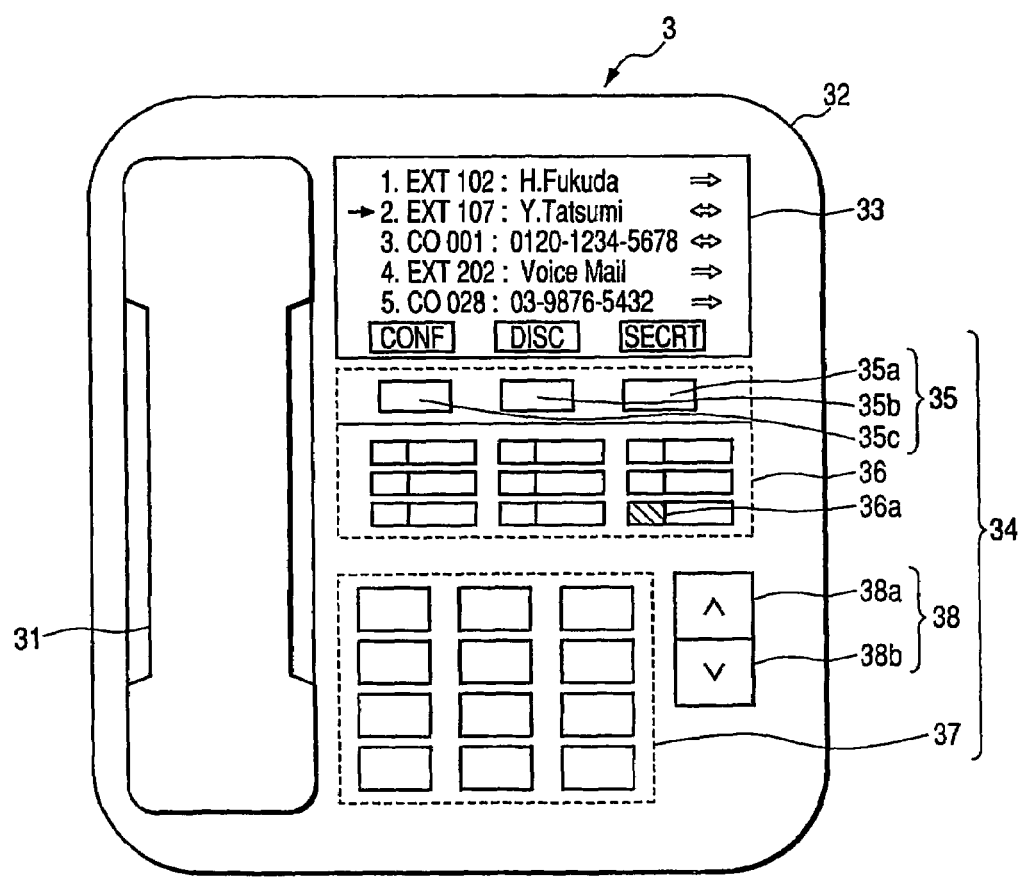
FIG. 4 is an exterior view of an extension telephone of FIG. 1.
Figure 5:
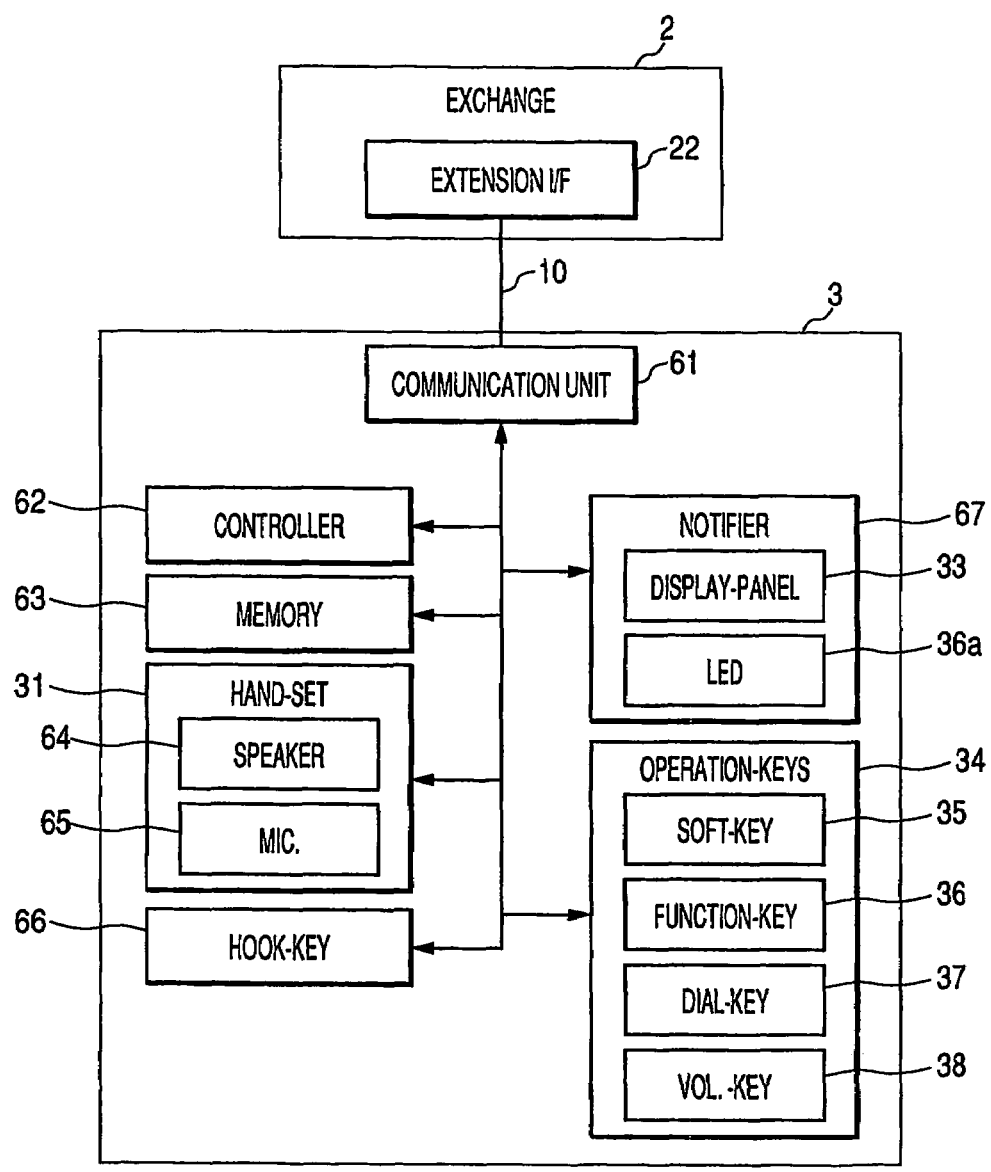
FIG. 5 is a hardware configuration diagram of the extension telephone of FIG. 1.
Figure 6:
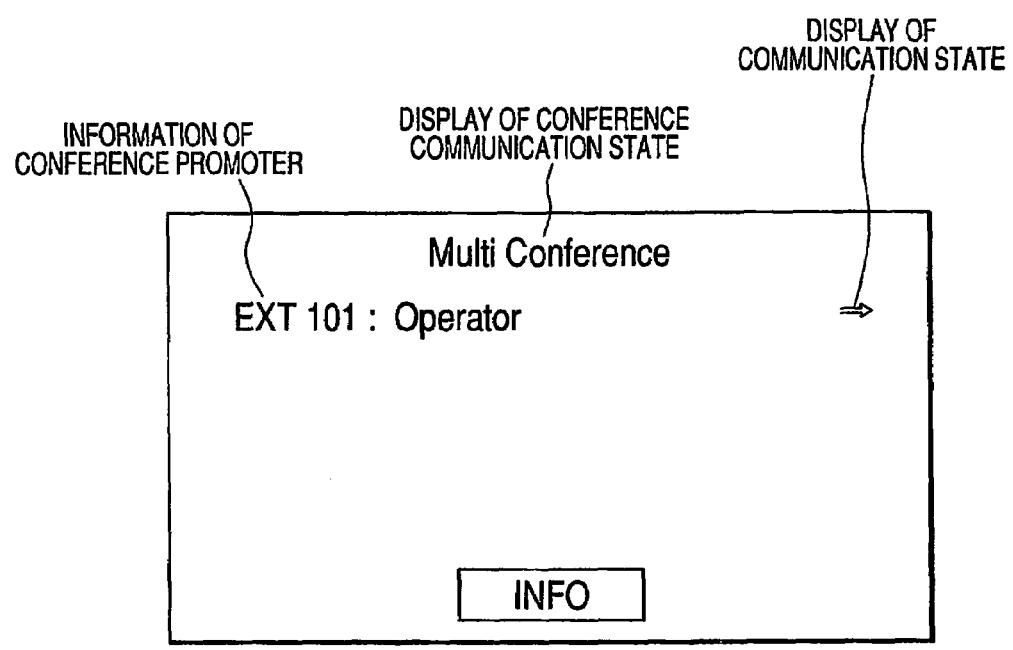
FIG. 6 is a diagram showing a display example of a display panel of the extension telephone of a participant of a conference.

A configuration of a conference system using an exchange according to an embodiment of the invention will be described with reference to the accompanying drawings. FIG. 1 is a diagram for explaining a conference system using the exchange according to the embodiment of the invention. Of FIG. 2 presenting diagrams for explaining the contents of a memory, FIG. 2(a) shows an example of group setting information, and FIG. 2(b) shows an example of user's name setting information. FIG. 3 is a hardware configuration diagram of the exchange of FIG. 1. FIG. 4 is an exterior view of an extension telephone of FIG. 1. FIG. 5 is a hardware configuration diagram of the extension telephone of FIG. 1. FIG. 6 is a diagram showing a display example of the display panel of the extension telephone of a participant of the conference.

First of all, the configurations of the conference system and the exchange of the embodiment are described with reference to FIG. 1. As shown in FIG. 1, a conference system 1 includes: an exchange 2; an extension telephone 3 (as so numbered when the extension telephone is generally called); a voice storage 4; and a PC telephone 5 or a personal computer (as will be abbreviated into "PC") having a telephone function.

The exchange 2 is provided with communication lines of plural kinds for connecting those components. Of the lines, an extension line 10 can connect the extension telephone 3 or the voice storage 4. For example, extension telephones 3a and 3b are connected with extension lines 10a and 10b, and the voice storage 4 is connected with an extension line 10c (although the lines are indicated by 10a, 10b and 10c, in case the individual devices are individually referred to). For convenience, only three extension lines 10a to 10c are shown, but four or more extension lines could be connected with the exchange 2.

Moreover, the exchange 2 is connected with a line wire 11 such as a public network or a leased line. Here, the extension lines 10a to 10c and the line wire 11 are physical wires (or electric wires) composed of two lines or four lines. The plural interior lines can be sheathed into one cable.

The exchange 2 is provided with various interfaces for communicating with the aforementioned individual devices. That is, the exchange 2 is provided with a line interface 21, extension interfaces 22 and a CTI (Computer Telephone Integration) interface 24.

The line interface 21 controls the connection or disconnection of such a call with or from a time-division switch as has terminated or originated from the public network or the leased line via the line wire 11. On the other hand, the extension interfaces 22 control the connections or disconnections between the extension lines 10a to 10c and the time-division switch 23. The extension interfaces 22 have functions to transmit tones (as will be generally called the "progress tone") according to states, such as a busy tone indicating that the line is busy or a ring-back tone indicating the call is terminating, to the extension lines 10a to 10c.

The CTI interface 24 has communications with the outside so as to configure the various CTI systems integrating the computer system. The circuit configuration employs the general-purpose interface IC. This interface IC can be the USB (Universal Serial Bus), Ethernet (known under the registered trade mark) (IEEE802.3), the RS-232C for bidirectional serial communications, or the bidirectional parallel interface.

The exchange 2 is connected by the CTI interface 24 with the PC telephone 5 via the general-purpose communication line 12. For this communication line 12, a suitable cable is determined according to the interface of the CTI interface 24. In case the LAN is employed as the CTI interface 24, a line concentrator such as the HUB, or a relay such as the repeater is used with the PC telephone 5.

Here, the line interface 21 and the CTI interface 25 are not limited to one in number, as shown in FIG. 1, but may be provided in plurality. Moreover, the extension interfaces 22 are not limited to three in number, as shown in FIG. 1, but may be provided in multiplicity. These numbers are suitably determined to necessary values according to the capacity required for the system entirety of the exchange 2.

The exchange 2 is further provided with the time-division switch 23, a conference trunk 25, a controller 26, a memory 27 and a tone generator 28.

The time-division switch 23 is controlled by the controller 26 to connect the line wire 11 and the extensions 10a to 10c and to establish channels among the extension lines 10a to 10c. The time-division switch 23 is similar to the ordinary one used in the digital conversion system. The time-division switch 23 includes a communication memory and a peripheral control circuit for controlling the address of the communication memory according to a time slot. These communication memory and peripheral control circuit are integrated like the general time-division switch into a large scale integrated circuit (LSI) so that they are serviced as one general-purpose IC. The detailed description of the operation contents of that IC is omitted while resorting to a Japanese Patent Laid-Open Publication (e.g., JP-A-2000-333279), for example.

The conference trunk 25 is controlled by the controller 26, and is also called the "conference circuit" having a function to synthesize the voice of the line for the bidirectional speech inputted at the conference communications from the time-division switch 23. This conference trunk 25 has such a fundamental configuration of an adder (or subtracter) for synthesizing the voice as is composed of an AND circuit, an OR circuit and a gate circuit. The conference trunk 25 is integrated, when generally used as a large scale integrated circuit (LSI), into the LSI together with a peripheral control circuit which is prepared by integrating the adder (or subtracter) in a large scale and controlled according to the time slot. The conference trunk 25 of this embodiment is provided with four lines for synthesizing the voice. This line number can be suitably determined according to the scale of the exchange.

The controller 26 employs a general-purpose one-chip CPU. The controller 26 processes the following individual functions. One function is to control the exchanging actions between the line wire 11 and the extension lines 10a to 10c and between the extension lines 10a to 10c. The controller 26 has another function to communicate the data with the extension telephones 3a and 3b or the voice storage 4 through the extension interfaces 22. Still another function is to communicate the data with the PC telephone 5 through the CTI interface 24.

On the other hand, the controller 26 defines, in the memory 27, the controls of the displays or the lighting, flashing and extinguishing of lamps in the extension telephones 3a and 3b, the functions of individual function buttons, and the functions responding to special number inputs by dial-keys.

The controller 26 performs, when it detects the depression of the functional button or the special number input by the dial-key, the operations which are so defined in the memory 27 as to correspond to the function or the special number. In response to the special number input by the function button or the dial-key from the extension telephones 3a and 3b, for example, the controller 26 controls the time-division switch 23 and the conference trunk 25 thereby to prepare the individual lines of the conference communications for the unidirectional or bidirectional communications.

On the other hand, the one-chip CPU is integrated to have the peripheral control functions. The aforementioned controller 26 is provided with the (not-shown) timer as time measuring means for counting the CPU clock signals generally to attain the time-measured result. Therefore, the timer can be utilized as a programmable one by programming the counted value. With the time monitoring function using that programmable timer, the termination is stopped by monitoring the time period of the extension telephones 3a and 3b which have terminated but have not been hooked off.

The memory 27 stores various set pieces of information and programs. For storing these various set pieces of information, for example, a SRAM (Static Random Access Memory) is backed up with a battery. A DRAM (Dynamic Random Access Memory) is used as a work memory for processing the operations. There are further used a flash memory for the boot program to start the programs, and a card memory for storing the programs. The memory configuration thus far described is one example for configuring the minimum system so that its scale is enlarged according to the function of the exchange. In this embodiment of the invention, those memory elements will be generally described as the memory 27.

The memory 27 stores the extension number assigned to the extension line 10 and the telephone number (or the telephone number of the partner of the line wire) to be originated to the line wire 11, and groups at least two of the telephone numbers into one or more groups to be registered. In this group, the telephone numbers relating to the employees inside of a company or a branch or outside of the company are registered as the group setting information. The group numbers are assigned to the individual groups, and the controller 26 specifies the groups with the group numbers.

The tone generator 28 is a general-purpose signal generator for a programmable audible frequency. When the tone generator 28 is started by designating a signal kind with the program, it generates tone signals of various kinds. These tone signals are employed for the aforementioned progress tones. These progress tones are sent through the time-division switch 23 to the line interface 21 or the extension interfaces 22. The controls of the designation of the tone signal kind in and the start of the tone generator 28, and the control of the time-division switch 23 are made by the controller 26. The following kinds can be designated for the tone signals. The tone signals designated are exemplified by the busy tone indicating that the line is busy, the dial tone indicating the dial number can be received, the ring-back tone indicating the call is terminating, and the holding tone at the time when the line is being held.

FIG. 2 is a diagram for explaining the contents of the memory of FIG. 1, and explains the aforementioned group setting information. FIG. 2(a) shows the set examples of the group setting information to be registered in the memory 27. In the group setting information, the group numbers assigned to the individual groups, the group names and the members are registered to correspond to one another. For example, a group number 1 has a group name "Group-A". Of members: the member 1 is registered with a telephone number of 102; the member 2 with a telephone number of 0120-1234-5678; and the member 3 with a telephone number of 107. The subsequent members are omitted but are registered to a member n.

The case, in which the conference communications are being done in the group of the group number 1 shown in FIG. 2(a), is shown in the display example of the display panel of FIG. 4.

The telephone numbers and the names of the users corresponding to the telephone numbers are transmitted by the controller 26 of the exchange 2 to the extension telephones 3a and 3b through the extension interfaces 22 on the basis of the group setting information and the user's name setting information registered in the memory 27.

FIG. 2(b) is a diagram for explaining the examples of the user's name setting information. These telephone numbers of the members are registered such that the telephone numbers and the names of the telephone users of the telephone numbers are related to each other. In the user's name setting information of FIG. 2(b), the telephone number (or the extension number) of the member 2 is not registered. This is because the telephone number (or the extension number) of the member 2 is that of the line wire and has no name. On the other hand, the memory 27 defines the functions of the function-keys disposed in the extension telephones 3a and 3b, and the functions of the special numbers of the dial-keys.

FIG. 3 is a hardware configuration diagram of the exchange of FIG. 1. The conference system in FIG. 1 has been described on the basis of the functional elements. Therefore, the conference system is described in connection with the hardware configuration in the embodiment of the invention. A CPU 41 is a general-purpose one-chip CPU such as a Hitachi product HD6417709SF133B.

A control data bus 42 is used with the CPU 41 and is composed of an address bus, a data bus and a status bus. Any of these buses has a general-purpose configuration depending on the CPU 41. A highway 43 is a highway for the time-division data which are required for the general time-division exchange control. The CPU 41 controls a line control ASIC through the control data bus 42 and the highway 43, and the line control ASIC 49 generates a CODEC control 44 for specifying the peripheral terminal thereby to control a CODEC 51 for the line interface 21 and the extension interface 22 connected with the CODEC control 44.

The memory 27 is a general name of the entirety configured by combining plural memory elements. Each of these memory elements is configured in the following manner. Numeral 45 designates an SD Card Memory for storing the system operations program of the exchange 2. This SD Card Memory 45 is exemplified by RP-SP032 of Panasonic having a capacity of 32 Mbytes. Because of the Card Memory, at the time of updating the system operations program, it is possible not only to rewrite the stored contents partially but also to cope with the card replacement. Numeral 46 designates a Flash Memory for storing the boot program at the system starting time. This Flash Memory 46 is exemplified by MBM29LV400BC of Fujitsu having a capacity of 4 Mbits. Numeral 47 designates a SRAM Memory for storing the various set data and for holding the stored data when backed up with the battery. This SRAM Memory 47 is exemplified by R1LV0416CSB of RS technology having a capacity of 4 Mbits. Numeral 48 designates a DRAM Memory for storing the system operations program and the various set data. This DRAM Memory 48 does not hold the data when backed up with the battery. The DRAM Memory 48 is exemplified by MT48LC2M32B2TG of Micron Technology, Inc. having a capacity of 64 Mbits.

Numeral 49 designates a line control ASIC covering an IO unit for controlling the inputs/outputs of the aforementioned time-division switch 23 and conference trunk 25 and the various interfaces to be described. As described hereinbefore, the line control ASIC 49 is configured into an ASIC (Application Specific Integrated Circuit), in which the individual units are so integrated into the large scale integrated circuit as to contain the peripheral control circuit most suited for this embodiment.

The aforementioned line interface 21 and extension interfaces 22 are made to have substantially identical internal configurations. Using the CODEC 51, the line control ASIC 49, as controlled by the CPU 41, converts analog signals inputted from the individual interfaces into digital signals, and writes the data at time slot positions corresponding to the physical positions of the individual interfaces on the highway 43. On the other hand, the line control ASIC 49 reads the data at the time slot positions corresponding to the physical positions of the individual interfaces, and converts them into analog signals and outputs the analog signals to the individual interfaces. The CODEC 51 is exemplified by the CODEC IC of Infineon Technologies AG.

An IF circuit 52 is a very general interface circuit, which is composed of a matching element for matching the impedances of the extension line 10 and the line wire 11, and a line driver-receiver for transmitting/receiving signals.

In the case of the extension interfaces 22, in order to relay the data signals to be transmitted/received between the extension telephone 3 and the CPU 41, a relay circuit is packaged to perform the timing control between the data line of the extension telephone 3 and the control data bus 42. Here is omitted the detailed description of the relay circuit, because the contents of the relay circuit are not the subject of the invention.

A general-purpose interface IC corresponding as the CTI interface 24 to the USB, the IEEE802.3 and the RS-232C, as described above, is employed as a CTIIF circuit 53. This CTIIF circuit 53 is integrated together with the interface circuit with the control data bus 42. As in the case of the extension interfaces 22, there is packaged a relay circuit for the timing control between the data lines and the control data bus 42. Here is omitted the detailed description of the relay circuit, because the contents of the relay circuit are not the subject of the invention.

FIG. 4 is an exterior view of the extension telephone of FIG. 1. The extension telephone 3 is constructed to include a hand-set 31 and an extension telephone body 32. The extension telephone body 32 is provided with a display panel 33 and an operation-key 34.

A liquid crystal display panel can be employed as the display panel 33. This display panel 33 displays the data which are transmitted from the controller 26 of the exchange 2 through the extension interfaces 22.

The operation-keys 34 are provided with soft-keys 35, function-keys 36, dial-keys 37 and volume-keys 38. These individual keys are generally called the operation-keys 34.

The soft-keys 35 can be suitably changed in their functions from the exchange 2 according to the mode in which the extension telephone 3 calls. According to the call mode, therefore, the functions of the soft-keys 35 are displayed below the display panel 33. The soft-keys 35 are arranged at the positions corresponding to the displays of their functions thereby to enhance the convenience of the user.

The function-keys 36 are push button switches having the display functions. For example, the nine function-keys 36 are arranged, as shown. For the function-keys 36, the functions assigned to the individual switches are stored in the memory 27 of the exchange 2. At the time of conference conversations, for example, the function-keys 36 are used for ringing additional participants, and the memory 27 is registered with one telephone number corresponding to one function-key 36. The function-key 36 is provided with LEDs (Light Emitting Diode) 36a having display functions to light in two colors (e.g., red and green). These individual LEDs 36a can be lit, flashed and designated with colors by the exchange 2 so that they can be used for displays, guides and warnings.

The dial-keys 37 are composed of numeral keys and symbol keys and are employed to input the telephone numbers and the special numbers. These special numbers are registered together with their corresponding functions in the memory 27 of the exchange 2.

The volume-keys 38 are composed of two keys of an upward key 38a and a downward key 38b. In an ordinary one-to-one calling case, the upward key 38a of the volume-keys 38 can raise the voice of the hand-set 31, and the downward key 38b can lower the voice of the hand-set 31. In the case of conference conversations, on the other hand, the upward key 38a can move a cursor displayed on the left-hand side of the display panel 33, upward, and the downward key 38b can move the cursor downward. In accordance with the conference mode (i.e., an ordinary conversation or a conference conversation), the functions of the volume-keys are separately used by the control of the exchange 2.

FIG. 5 is a hardware configuration diagram of the exchange of FIG. 1. The extension telephone 3 is connected with the exchange 2 via the extension line 10. This extension line 10 is provided with a communication unit 61 for transmissions/receptions. Like the extension interfaces 22, the communication unit 61 is provided with the IF circuit 52. On the other hand, the CODEC control is not employed so that the communication unit 61 is interfaced with the control bus of a controller 62.

This controller 62 controls the entire operations of the extension telephone 3. The various set conditions are set in a memory 63. A small-scale general-purpose one-chip CPU is used to configure an ASIC together with the peripheral controller.

The hand-set 31 is called the entirety including a speaker 64 and a microphone 65. The speaker 64 has functions of a DA conversion and a voice amplification, and the microphone 65 has functions of a microphone signal amplification and an AD conversion.

A hook-key 66 detects whether the hand-set 31 is placed (i.e., on-hook) on the extension telephone or taken up (i.e., off-hook). The hook-key 66 is key-scanned together with the operation-keys 34 by the controller 62, and its ON/OFF is recognized by the controller 62. The recognition result is transmitted through the communication unit 61 to the exchange 2.

A notifier 67 is controlled by the controller 62 to control the displays of the display panel 33 and the LED 36a. The display panel 33 is displayed by the designation of the character to be displayed and by the display output, and the LED 36 controls the lighting of the individual displays. For the display control and the lighting control, there is employed a general-purpose driver element, which is integrated to actively control the driver interfaced with the control bus of the controller 62 to latch the control data and drive the desired output current.

Here, the contents relating to the extension telephone are disclosed in JP-A-2002-084370, especially in FIGS. 2 and 3 (corresponding to Laid-Open US Publication of No. US-2002-0048353-A1). Therefore, the overlapped explanation of the remaining detailed contents is omitted by quoting the above-specified Publication Number.

Reverting to FIG. 4, description is made on a display example of the display panel. The uppermost or first portion of the display panel 33 has a display "EXT" indicating that the call is made through the extension interfaces 22. The display indicates that the conference partner is the extension telephone of the telephone number 102, and that the user's name of the extension telephone of the extension number 102 is "H. Fukuda". On the right-hand side of the user's name "H. Fukuda", there is displayed an arrow indicating the conference state, and the symbol "→" (i.e., the rightward arrow) indicates the unidirectional call. On the other hand, the conference state "←→" (i.e., the rightward and leftward arrows) indicates that the bidirectional call.

Moreover, the third position from above displays "CO" indicating that the call is made through the line interface 21. The next "001" indicates that the line name of the line wire 11 used has a line name "001". Moreover, the telephone number of 0120-1234-5678 is one with a partner on the line wire but has no registration of the user's name setting information. Therefore, the telephone number is displayed, as it is, at the user's name of the display panel 33.

In the case of the conference conversations, the line names, the telephone numbers, the names and the conference states of the participants in the conference conversations are displayed on the display panel 33.

Thus, FIG. 6 shows a display example of the extension telephone which has participated in the conference conversations in response to the extension telephone having demanded the conference conversations. In the conference conversation case, the display panel 33 displays the "Multi Conference" indicating that the conference is in the conference state, the telephone number of the telephone having demanded the conference conversations, and the name of the user of the telephone number.

In the mode for the conference conversations, as shown in FIG. 4, the soft-keys 35 of the extension telephone of the conference caller having demanded the conversations display the assigned soft-keys: a first soft-key 35a assigned the "CONF" or the function to transmit the demand for the bidirectional communications to the exchange 2 at the time of the conference communications; a second soft-key 35b assigned the "DISC" or the function to transmit either the demand to change the bidirectional communications with the communication partner into the unidirectional communications or the demand to cut the unidirectional communications, to the exchange 2; and a third soft-key 35c assigned the "SECRT" or the function to demand the secret bidirectional communications with only a specific telephone during the conference communications.

As shown in FIG. 6, moreover, in the mode for the conference communications, the second soft-key 35b of the extension telephone of the conference participant is assigned by the exchange 2 with the "INFO" or the function to demand the bidirectional communications.

Reverting to FIG. 1, the voice storage 4 is instructed by the exchange 2 to record and reproduce the voice message through the extension line 10. The general contents of the voice storage 4 are disclosed in JP-A-H05-14508. In the invention, the voice storage 4 is just one device of one terminal connected with the extension interfaces but not the subject of the invention. Therefore, the detailed description of the voice storage 4 is omitted by disclosing and referring to the prior technical publications on the voice storage 4.

The PC telephone 5 is connected with the not-shown network and has a function to transmit electronic mails to the network. At this time, the PC telephone 5 can receive the voice message stored in the voice storage 4, as a file via the communication line 12, and can transmit the electronic mail by adding the file thereto. The electronic mail address to be employed as the electronic mail is the electronic mail address of the user of the extension telephones 3a and 3b or another extension telephone connected with the exchange 2 registered in advance in the storage of the PC telephone 5. This electronic mail address may be so registered in the exchange 2 as to correspond to the telephone number of the extension telephone, and is notified from the exchange 2 via the communication line 12 to the PC telephone 5.

Thus, the PC telephone 5 has the function to transmit the electronic mail. Therefore, the exchange 2 is enabled to notify the nonparticipants of the contents of the conference, by storing the conference communications as the voice message in the voice storage 4, by transmitting the voice message from the voice storage 4 through the exchange 2 to the PC telephone 5 and by notifying the PC telephone 5 of the electronic mail address of the nonparticipating users of the extension telephones 3a and 3b and another extension telephone from the exchange 2.

Generally, the PC telephone 5 is realized by starting a software for realizing the telephone function in the computer. In the invention, moreover, the PC telephone 5 is one device at one terminal connected with the extension interfaces. Therefore, the detailed description of the PC telephone 5 is omitted because the PC telephone 5 is not the subject of the invention.

The actions of the conference system using the exchange thus configured according to the embodiment of the invention are described with reference to the accompanying drawings. FIG. 7 to FIG. 16 are sequence charts for explaining the actions of the exchange. Of FIG. 7 to FIG. 16: FIG. 9 is a diagram for explaining the actions of the conference trunk in the bidirectional communications; FIG. 13 is a diagram showing a display example of the secret communications in the display panel of the extension telephone; and FIG. 14 is a diagram for explaining the actions of the conference trunk in the secret communications.

It is assumed in the following description that the relations between the plural extension telephones are equally handled. For conveniences of description, therefore, it is assumed that the conference promoter employs one extension telephone 3a (i.e., the first extension telephone) whereas a participant A or the like employs another extension telephone.

(Unidirectional Communications)

The first description is made on the actions of the exchange 2 to demand the conference communications from the extension telephone 3a and to call the participants and start the conference communications. In short, this is the start of the unidirectional communications (i.e., the unidirectional communications from the promoter to the participants).

Figure 7:
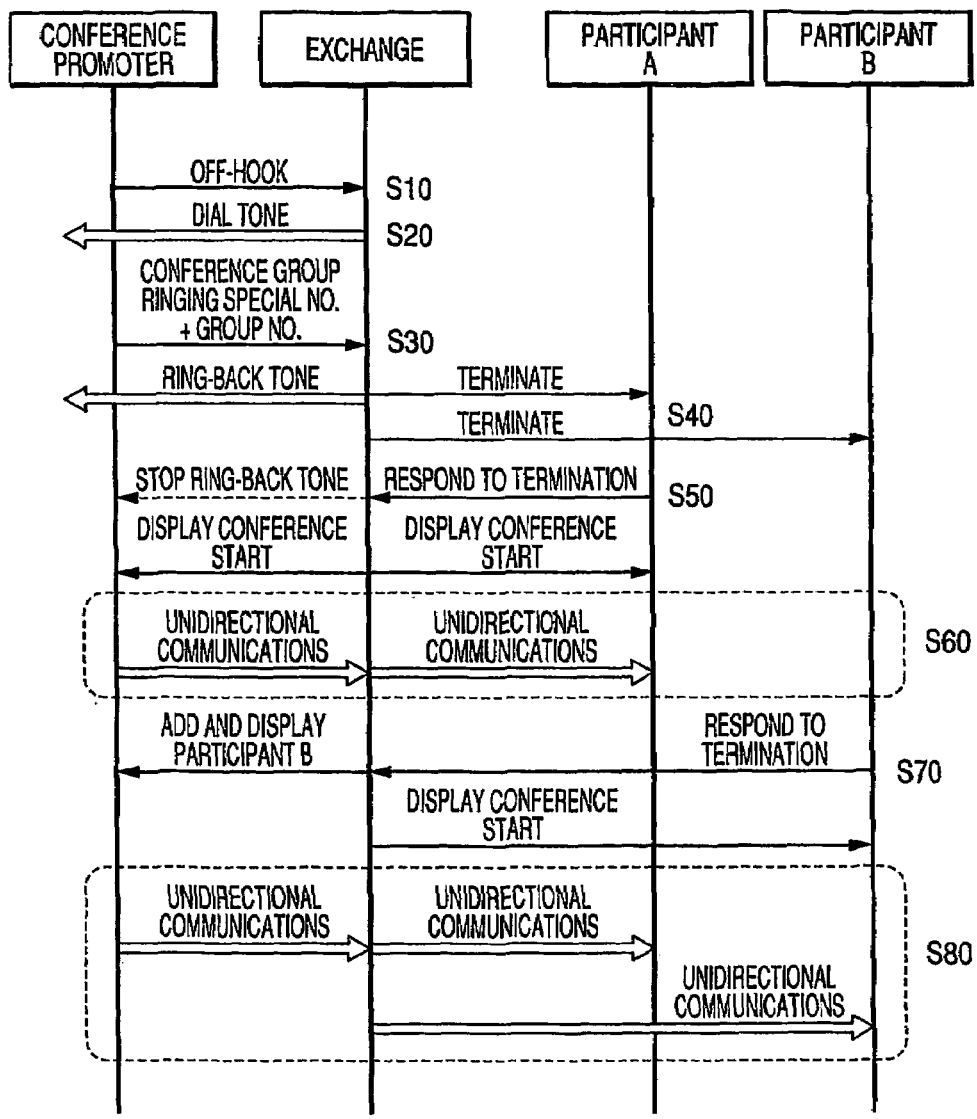
FIG. 7 is a sequence chart for explaining the actions of the exchange.

In FIG. 7, the conference promoter (employing the extension telephone 3a, for example) hooks off the hand-set 31 of the extension telephone 3a (at S10). Then, the dial tone is sent from the exchange 2 (at S20).

The conference promoter operates the dial-keys 37 of the extension telephone 3a to input the special number (as will be abbreviated as the "conference opening demand") for ringing the conference group demanding the conference communications and the group number. In response to the push of the dial-keys 37, the extension telephone 3a transmits the notification demanding the conference communications to the exchange 2. If the group ringing special number is 240 and if the group number is 1 (as referred to FIG. 2(a)), the conference promoter pushes the dial-keys 37 to 2401 (at S30).

The controller 26 of the exchange 2 receives the group ringing special number and the group number from the extension telephone 3a through the extension interfaces 22. The controller 26 refers to the memory 27 thereby to recognize that the extension telephone 3a is demanding the conference communications of the group number 1. The controller 26 causes the group setting information of the memory 27 to terminate the telephone number of the member at the telephone number of the member belonging to the group number 1 (as will be abbreviated as the "conference calling termination") and to send out the ring-back tone to the extension telephone 3a of the conference promoter (at S40).

It is now assumed that the user of the extension telephone 3b is contained as the participant A in the member of the group number 1 (as referred to FIG. 2(b)). The participant A hooks off his or her extension telephone 3b ringing as a result of the termination thereby to participate in the conference. By this operation, the exchange 2 makes the extension telephone 3a of the conference promoter stop the ring-back tone (at S50).

At this time, the controller 26 of the exchange 2 controls the time-division switch 23 so that the unidirectional communications may be made from the extension telephone 3a of the conference promoter to the extension telephone 3b of the participant A. The unidirectional communications called here are of the communication mode, in which the communications are sent in one direction from the conference promoter to the participant.

Moreover, signals are individually sent from the exchange 2 to the extension telephones 3a and 3b. At this time, the symbol "→" (i.e., the rightward arrow) indicating the telephone number, the user's name and the unidirectional communications of the participant A is displayed in the display panel 33 of the extension telephone 3a of the conference promoter. On the other hand, the display indicating the conference communications, the telephone number of the conference promoter, the user's name and the symbol "→" (i.e., the rightward arrow) indicating the unidirectional communications are displayed (as will be abbreviated into the "unidirectional communication display") in the display panel 33 of the extension telephone 3b of the participant A (at S60).

Noticing the termination, a participant B hooks off another ringing (not-shown) extension telephone a little later than the participant A thereby to participate in the conference (at S70).

When the extension telephone 3 of the participant B is hooked off, the controller 26 of the exchange 2 controls the time-division switch 23 (at S80) so that the communications from the extension telephone 3a of the conference promoter may be unidirectional. It is similar to the operation of the aforementioned S60 that the signals are sent for display from the exchange 2 to another extension telephone.

FIG. 7 has described the example, in which the conference communications are started by calling the participant A demanding the conference communications from the extension telephone 3a and using the extension telephone and the participant B using the not-shown extension telephone. In case the telephone of the participant B is the partner of the line wire, i.e., the telephone needed to pass through the line wire 11 for the communications, the controller 26 acquires the telephone number of the line wire of the participant with reference to the memory 27 and transmits the telephone number from the line interface 21 so that the conference communications can be started.

Thus, in response to the notification from the extension telephone demanding the conference communications, the exchange 2 refers to the group setting information registered in the memory 27 to cause that information to terminate altogether at the extension or line wire partners of the participants (i.e., to transmit the telephone number from the line interface 21 to the line wire 11 in the case of the partner of the line wire and to causes the telephone number to terminate via the public network or the private line), and makes unidirectional the communications with the responding partner (i.e., the extension telephone and/or the telephone of the line wire partner) so that the conference not using the conference trunk 25 can be held.

(Bidirectional Communications)

Figure 8:
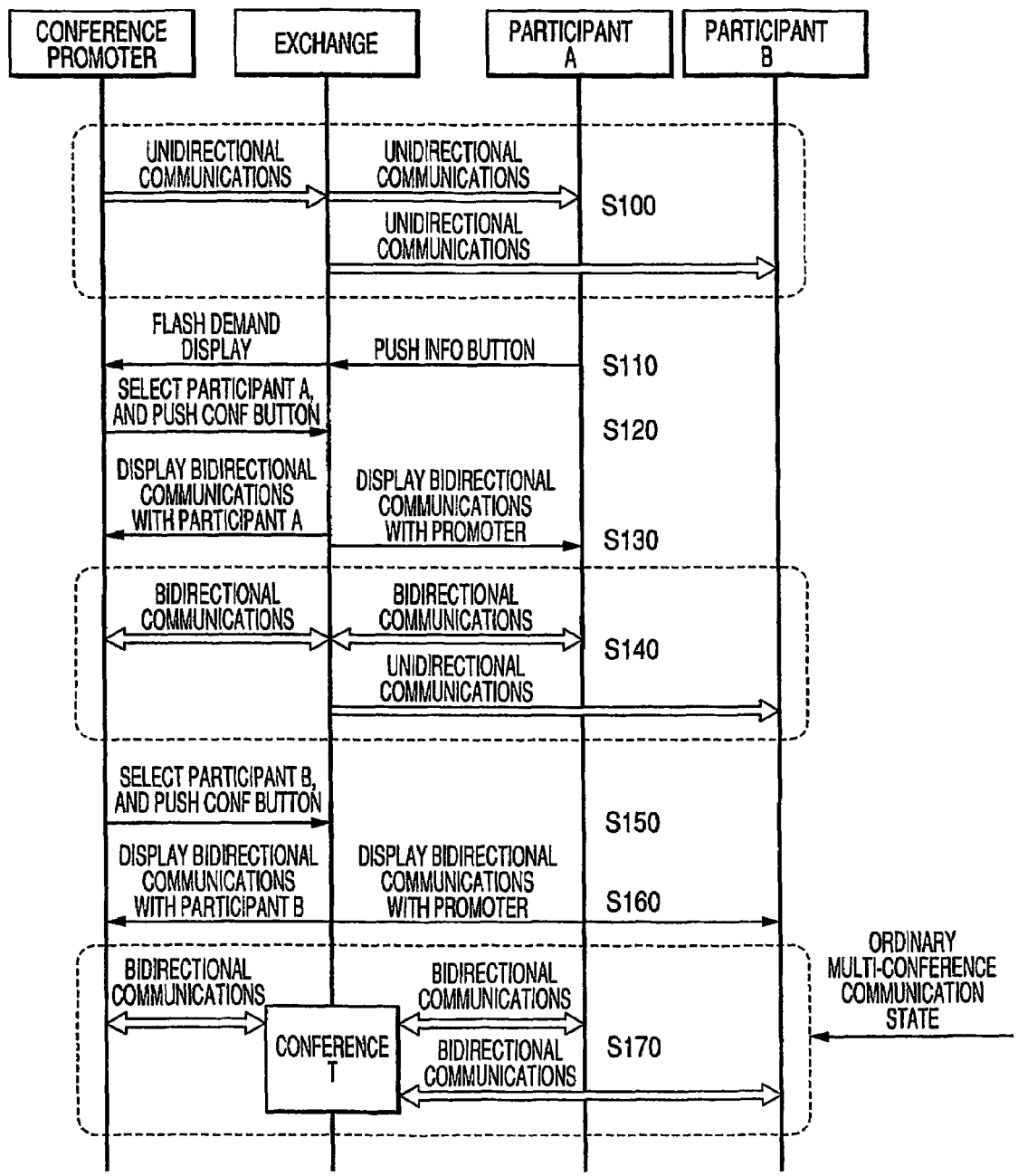
FIG. 8 is a sequence chart for explaining the actions of the exchange.

Here is described the case, in which the participant demands the conference promoter for the bidirectional communications, with reference to FIG. 8 and FIG. 9. This is the bidirectional communications (i.e., the bidirectional communications between the promoter and the participants). It is assumed that the conference promoter is doing the unidirectional communications with the participant A and the participant B (at S100 corresponding to S80 of FIG. 7). FIG. 9(a) is a diagram for explaining the actions of the conference trunk and the time-division switch at S100. The controller of the exchange 2 controls the time-division switch 23 to send the communications from the extension telephone 3a of the conference promoter to the participant A and the participant B thereby to realize the unidirectional communications.

Since the promoter and the individual participants have come into the mode of the conference communications, the volume-keys 38 of the extension telephone 3 function as the cursor operation keys in response to the signal of the exchange 2, as described hereinbefore. When the participant A pushes the second soft-key 35b of the extension telephone 3b, this extension telephone 3b transmits the notification of the "INFO" assigned to that second soft-key and demanding the bidirectional communications, to the exchange 2 (as will be abbreviated into the "demand for the bidirectional communications").

The controller 26 of the exchange 2 having received the notification of the "INFO" from the extension telephone 3b notifies the extension telephone 3a of the conference promoter of the demand of the participant A for the bidirectional communications. This notification is performed by sending the signal from the controller 26 to the extension telephone 3a thereby to flash the member corresponding to the telephone number of the participant A displayed in the display panel 33 of the extension telephone 3a. This notification enables the conference promoter to recognize the notification of the demand for the bidirectional communications from the participant A (at S110).

The conference promoter operates the volume-keys 38 of the extension telephone 3a, in case he or she approves the demand for the bidirectional communications from the participant A, to move the cursor displayed in the display panel 33 thereby to select the participant A and to push the first soft-key 35a. As a result, the extension telephone 3a transmits the notification of the "CONF" assigned to the first soft-key 35a, to the exchange 2 (at S120). In case the conference promoter designates the participant and demands the bidirectional communications, these bidirectional communications can be done while omitting the aforementioned approving procedure. The actions are similar to those of the designation of participants, the soft-key of the demand for the bidirectional communications, and the display of the bidirectional communications.

The controller 26 of the exchange 2 notifies the extension telephone 3a and the extension telephone 3b of the "CONF" received from the extension telephone 3a, so as to display the symbol "←→" (i.e., the rightward and leftward arrows) indicating the bidirectional communications (as will be abbreviated into the "bidirectional communication display") (at S130).

Figure 9A:
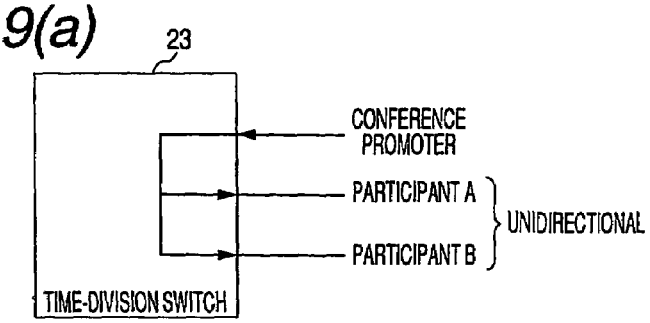
FIG. 9 presents diagrams for explaining the actions of a conference trunk in bidirectional communications.
Figure 9B:
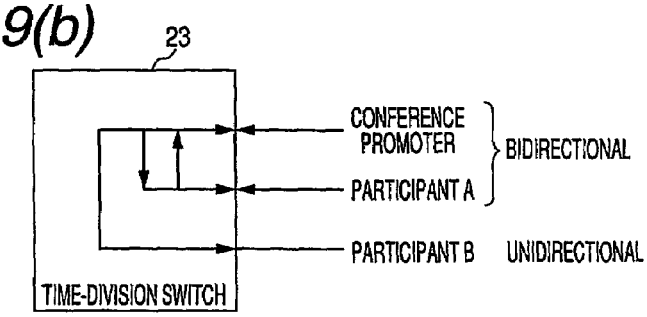

Moreover, the controller 26 of the exchange 2 controls the time-division switch 23 to form the channel so that the communications between the conference promoter and the participant A may be bidirectional. As a result, the conference promoter and the participant A can communicate in the bidirectional manner, and these communications can be unidirectionally heard by the participant B (at S140). FIG. 9(b) is a diagram for explaining the actions of the conference trunk and the time-division switch at S140. The time-division switch is controlled for the bidirectional communications between the conference promoter and the participant A, and the time-division switch is controlled to send the communications to the participant B from the extension telephone 3a of the conference promoter, thereby to realize bidirectional communications between the conference promoter and the participant A and unidirectional communications from the conference promoter to the participant B.

This is reasoned in the following. In the case (i.e., in the one bidirectional communication), in which the bidirectional communications are done between the conference promoter and one participant so that all the remaining participants can do nothing but the unidirectional communications, the conference trunk 25 need not be employed so that the exchange can be a simple conference system. The exchange 2 of this embodiment has been described such that the communications between the conference promoter and one participant are bidirectional and such that the conference trunk 25 is not employed when the communications with another participant are unidirectional.

Figure 9C:
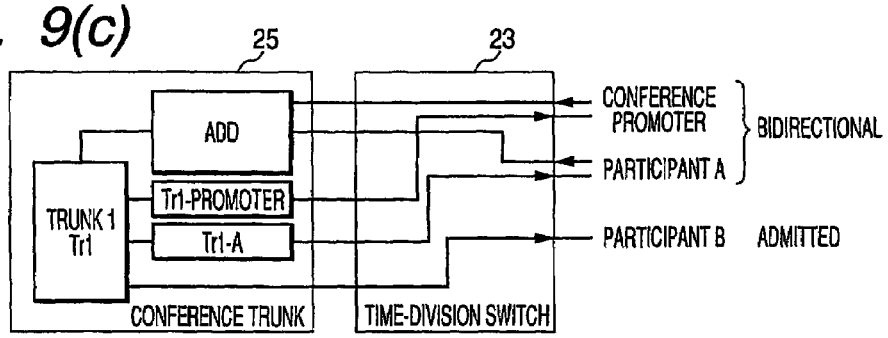

Here is described an example of the unidirectional communications employing the conference trunk 25. At the aforementioned S140, the participant B sets audible can be attended the bidirectional communications between the conference promoter and the participant A. It is assumed as in the actions up to the aforementioned S130 that the bidirectional communications are realized between the conference promoter and the participant A, and that the participant B is attended to participate in the unidirectional communications. FIG. 9(c) is a diagram for explaining the actions of the conference trunk and the time-division switch at S140. These actions are different from those of FIG. 9(b) in the employment of the conference trunk 25. At first, the controller 26 of the exchange 2 controls the time-division switch 23 so that the channel is set by setting the communications of the conference promoter as Up communications in the conference trunk 25. Likewise, the channel is set by setting the communications of the participant A as the Up communications in the conference trunk 25. The conference trunk 25 synthesizes the voices of the trunk 1 (Tr1) by adding the communications between the conference promoter and the participant A.

The trunk 1 (Tr1) is sent again as Down communications from the conference trunk 25 to the time-division switch 23 so that the received voice of the participant B is sent. The participant B receives only the Down communications of the communications between the conference promoter and the participant A so that he or she is attended to the unidirectional communications.

The trunk (Tr1) is sent as the Down communications of the conference promoter by subtracting and synthesizing the voice (of the trunk 1—the conference promoter) and by controlling the time-division switch 23. Likewise, the trunk (Tr1) is sent as the Down communications of the participant A by subtracting and synthesizing the voice (of the trunk 1—the participant A) and by controlling the time-division switch 23. This subtraction of the voice of the speaker from the trunk 1 (Tr1) is made so as to eliminate the physical disorder of the speaker, because the sound of the speaker is heard by the speaker. Thus, the attendance of the participant B by the unidirectional communications can be realized.

Next, the conference promoter operates, in case he or she wants to hear the opinion of the participant B, the volume-keys 38 of the extension telephone 3a, to move the cursor displayed in the display panel 33 thereby to select the participant A and to push the first soft-key 35a. As a result, the extension telephone 3a transmits not only the notification of the "CONF" assigned to the first soft-key 35a but also the telephone number of the participant B, to the exchange 2 (at S150).

The controller 26 of the exchange 2 notifies the extension telephone 3a of the conference promoter and the extension telephone 3b of the participant B, of the "CONF" received from the extension telephone 3a, so as to display the symbol "←→" (i.e., the rightward and leftward arrows) indicating the bidirectional communications (as will be abbreviated into the "bidirectional communication display") (at S160).

Figure 9D:
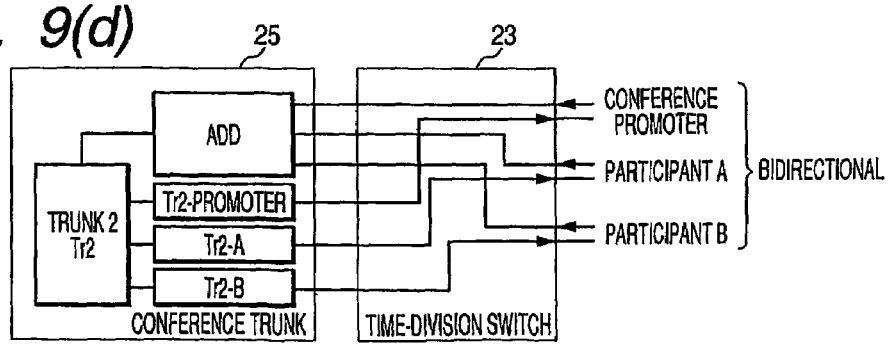

The controller 26 of the exchange 2 communicates the extension telephone of the participant B bidirectionally. FIG. 9(d) is a diagram for explaining the actions of the conference trunk and the time-division switch at S160. The controller 26 of the exchange 2 controls the time-division switch 23 and inputs the Up communications with the extension telephone 3a of the conference promoter, the extension telephone 3b of the participant A and the extension telephone of the participant B to the conference trunk 25. This conference trunk 25 adds the individual communications inputted, to synthesize the voice of a trunk 2 (Tr2), and outputs the Down communications to the time-division switch 23. The voice synthesization (i.e., the addition or subtraction) is realized by the addition (or the subtraction) for each time slot at the time-division exchange, as described hereinbefore.

The controller 26 controls the time-division switch 23 to form the channel (at S170) so that the synthesized communications of the trunk 2 (Tr2) outputted from the conference trunk 25 may be individually sent to the extension telephone 3a of the conference promoter, the extension telephone 3b of the participant A and the extension telephone of the participant B. At this time, the subtractions of (the trunk 2—the conference promoter), (the trunk 2—the participant A) and the (the trunk 2—the participant B) are sent out. As a matter of fact, for example, the participant A can hear the voice uttered from himself or herself. In order to eliminate the physical disorder of the communications, therefore, the synthesized voice signals to be sent to the individual participants are prepared by subtracting the voice of the participant himself or herself from the synthesized and added trunk of all.

Thus, the number of lines for the bidirectional communications can be determined from the extension telephone 3 of the conference promoter or the telephone having demanded the conference communications can be determined to reduce the number of lines of the bidirectional communications to be used in the conference communications to the necessary minimum. Therefore, it is possible to reduce the circuit of the conference trunk 25 or the conference circuit. The conference can be held with the reduced line number of the conference trunk 25 so that the multiple conferences can be simultaneously held.

(Responseless Stop)

Figure 10:
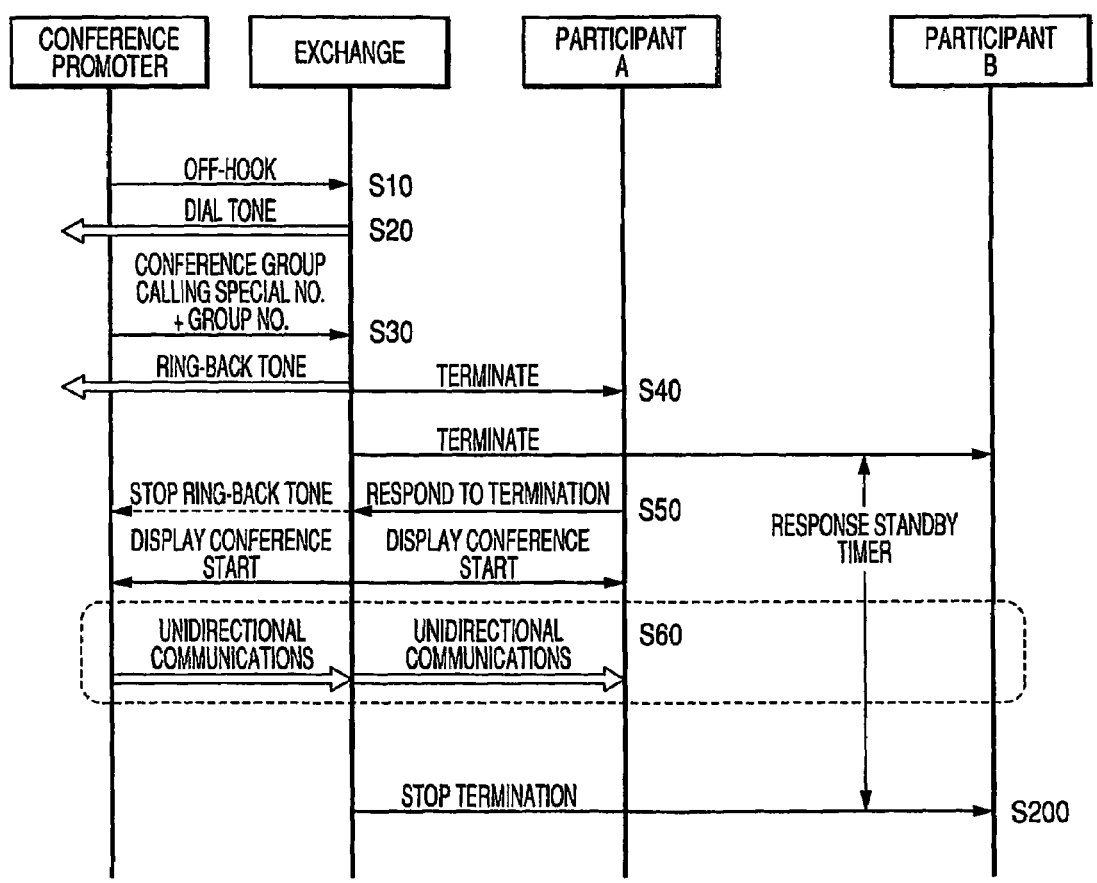
FIG. 10 is a sequence chart for explaining the actions of the exchange.

Next, the actions of the exchange 2 of the case, in which the participant does not respond to the termination of the start of the conference communications, are described with reference to FIG. 10. The procedure before the participant A participates in the conference communications and after the conference promoter hooked off the extension telephone 3a to notify the exchange 2 of the demand of the conference communications is identical to that of S10 to S60 of FIG. 7. Hence, the explanation of the procedure is omitted.

It is assumed that the participant A hooks off the extension telephone 3b and participates in the conference communications, but that the participant B leaves the extension telephone as it is ringing without noticing its termination. At this time, the controller 26 of the exchange 2 starts the timer to measure the time after the call of the conference communications terminated at the extension telephone of the participant B. Without the off-hook of the participant B till a predetermined time elapses, the controller 26 controls the extension interfaces 22 so that the termination at the extension telephone of the participant B may stop (at S200).

Thus, the time period from the termination of the conference communications at the extension telephone is measured, and the termination is stopped after lapse of the predetermined time period. As a result, the ringing of the extension telephone left as it is can be stopped to prevent the noises from troubling the periphery. Alternatively, the telephone number or the name of the communication partner is not displayed without any response for a constant time period, so that the conference promoter can know the absence of the participant.

(Addition of Participant)

Figure 11:
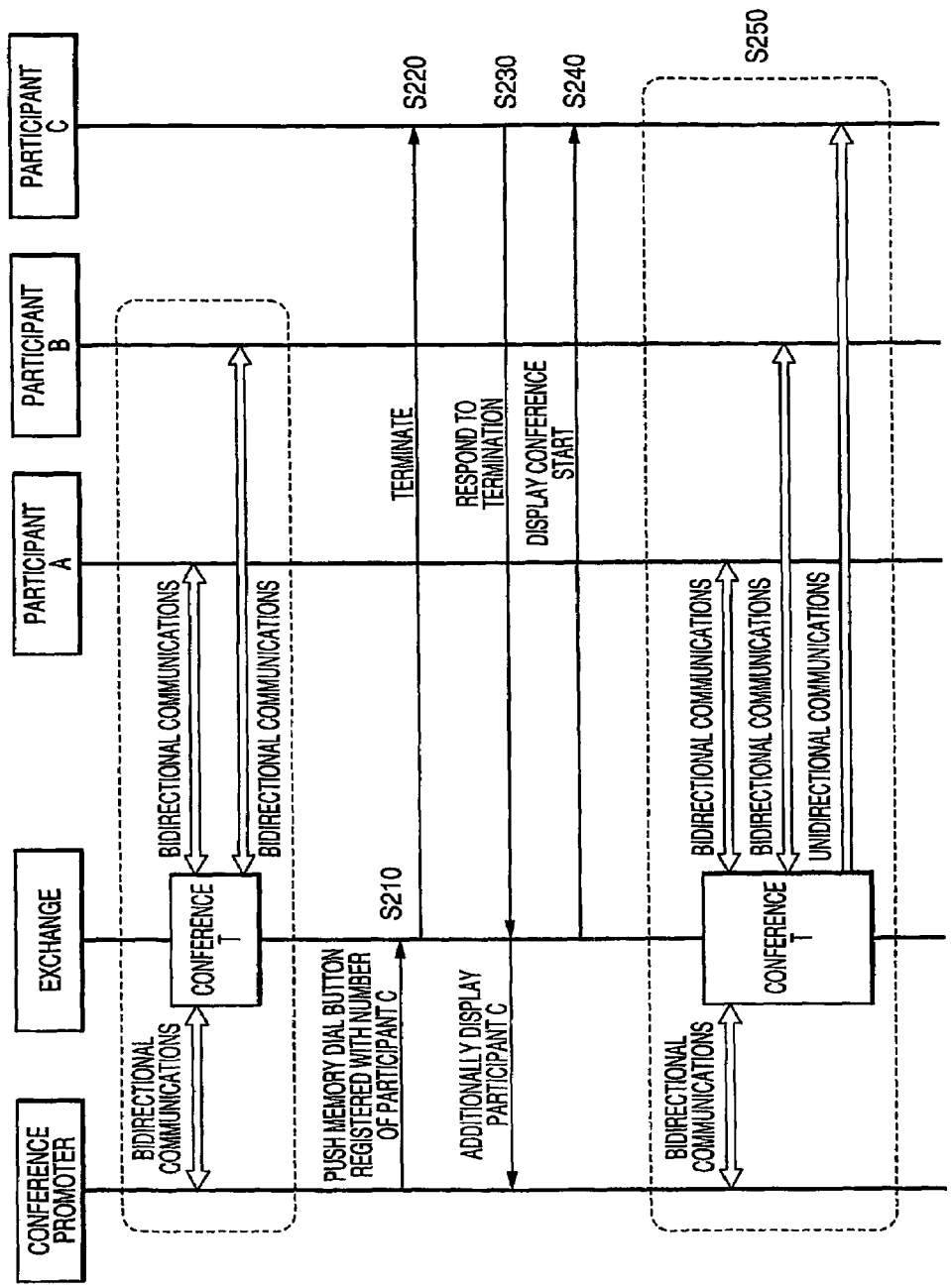
FIG. 11 is a sequence chart for explaining the actions of the exchange.

Next, the case, in which the participant is added during the conference communications, is described with reference to FIG. 11. At first, the conference promoter, the participant A and the participant B are doing the conference communications bidirectionally. This state is identical to that of S170, as shown in FIG. 8 (or FIG. 9(c)). In case the conference promoter wants to add a new participant C to the participant A and the participant B communicating in the conference with each other, the promoter pushes the function-key 36, to which the extension number of the participant C of the extension telephone 3a is assigned. In response to this push, the exchange 2 is notified (additional participation demand) of the information on the push of the function-key 36 from the extension telephone 3a (at S210).

In response to this notification, the controller 26 of the exchange 2 acquires the telephone number of the participant C corresponding to the function-key 36 from the memory 27, and causes the telephone number of the participant C to terminate as the conference communication call (i.e., the conference calling termination) (at S220).

The participant C hooks off his or her new extension telephone, although not shown in FIG. 1, to perform the responding operation. By this responding operation, the exchange 2 is caused to acquire the telephone number of the participant C or the user's name from the storage 27, and notifies the same to the extension telephone 3a of the conference promoter. By this notification, the states indicating the telephone number of the participant C, the user's name and the unidirectional communications are displayed in the display panel 33 of the extension telephone 3a so that the conference promoter recognizes that the participant C has participated in the conference communications.

Then, the controller 26 of the exchange 2 displays the information on the conference promoter in the display panel 33 of the extension telephone of the participant C (at S240).

Since the participant C participated in the conference communications, the controller 26 of the exchange 2 allows the conference promoter, the participant A and the participant B to bidirectionally communicate with each other and the participant C to unidirectionally communicate. The time-division switch 23 is controlled by the controller 26 of the exchange 2 so that the communications among the extension telephone 3a of the conference promoter, the extension telephone 3b of the participant A and the extension telephone of the participant B are inputted as the Up communications to the conference trunk 25. The conference trunk 25 synthesizes the individual speeches inputted, and outputs the synthesized speeches as the Down communications to the time-division switch 23. The controller 26 controls the time-division switch 23 to form the channel (at S250) so that the synthesized communications outputted from the conference trunk may be individually sent to the extension telephone 3a of the promoter, the extension telephone 3b of the participant A, the extension telephone of the participant B and the extension telephone of the participant C.

At this time, the actions of the conference trunk and the time-division switch are similar to those of S140 (FIG. 9(c)) of FIG. 8, and the bidirectional communications are done among the conference promoter, the participant A and the participant B whereas the unidirectional communications is done by the participant C. The difference is that one person is added to the bidirectional communications.

In dependence upon the number of participants to be subtracted from the synthesized trunk, the participant C can realize either the unidirectional communications (for receiving only the conference promoter) or the attendance (for receiving without subtracting the synthesized trunk) by the unidirectional communications, as described hereinbefore.

Here, the function to stop the termination after the predetermined time has been described as the operation subsequent to S60 of FIG. 7. Nevertheless, the function can naturally be applied to the case of the termination of a new participant by a similar operation procedure, although not repeatedly described.

Moreover, the addition of participants is not be limited to the bidirectional communications but can also be made to the aforementioned unidirectional communications, so that the procedure from S210 to S240 can be added to S80 in FIG. 7.

(Secrete Communications)

Figure 12:
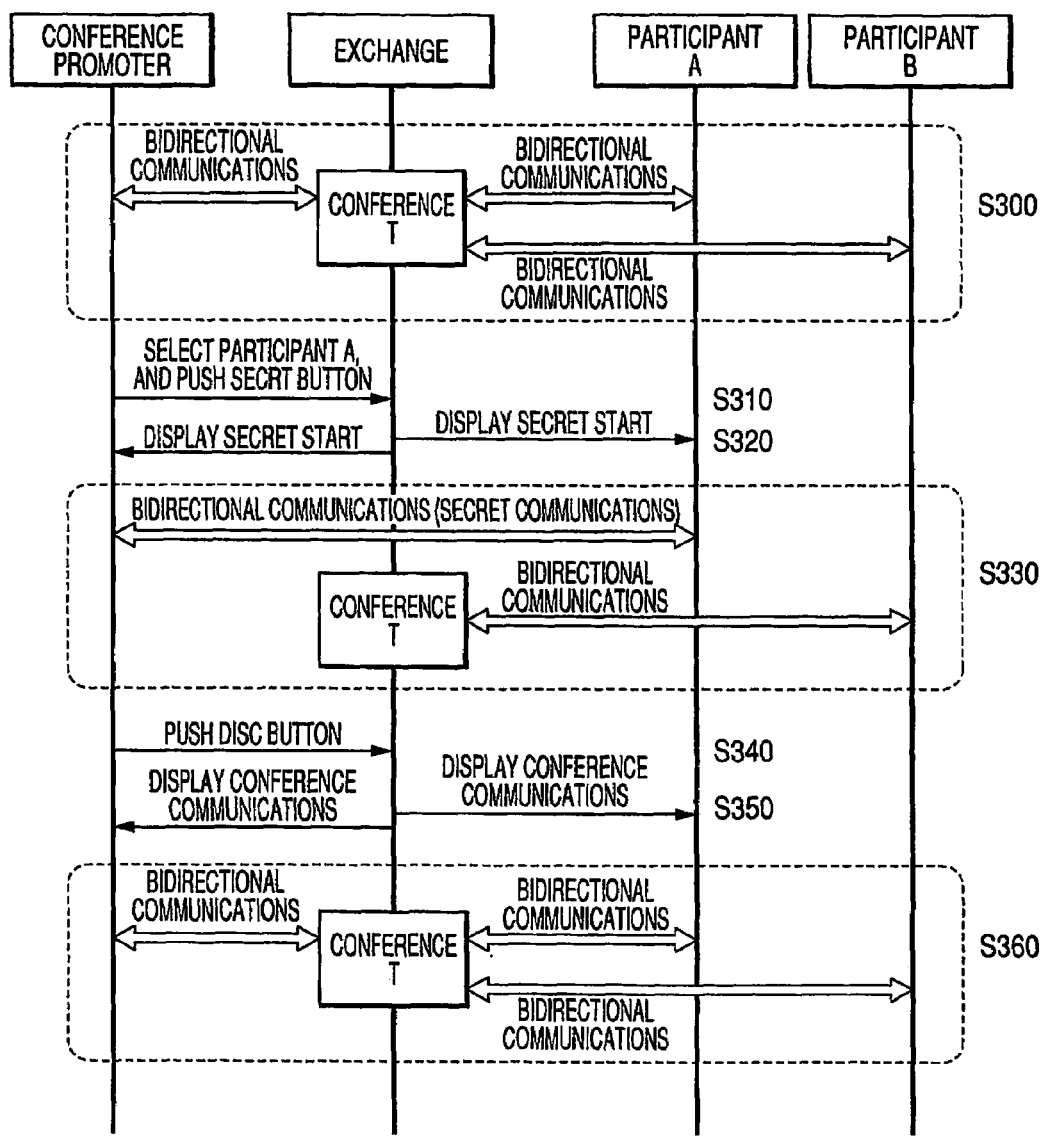
FIG. 12 is a sequence chart for explaining the actions of the exchange.

Next, the actions of the exchange 2 of the case, in which the conference promoter and the partial participants make secrete communications, are described with reference to FIG. 12. At first, it is assumed that the conference promoter, the participant A and the participant B are making the conference communications bidirectionally (at S300). This state is identical to that of S170 shown in FIG. 8.

It is subsequently assumed necessary that the conference promoter makes the bidirectional communications exclusively with the participant A making the conference communications. It is called the "secret communications" that the bidirectional communications are transferred to the bidirectional communications only between the specific extensions while keeping secret the communication contents of the remaining extensions. The participant A is selected from the list of participants displayed in the display panel 33 by the volume-key 38 of the extension telephone 3a, and the "SECRET" assigned to the third soft-key 35c is pushed. By this press, the exchange 2 is notified of the information on the third soft-key 35c and the extension number of the participant A selected (at S310) (as will be abbreviated into the "secret communication demand").

In response to this notification, the controller 26 of the exchange 2 notifies the extension telephone 3a of the conference promoter and the extension telephone 3b of the participant A, of it on the basis of the extension number of the participant A that the secret communications have been started. In response to this notification, the display indicating the secret communications, as shown in FIG. 13, is made on the display panels 33 of the extension telephone 3a and the extension telephone 3b.

Of the displays showing the state of the secret communications, FIG. 13(a) shows a display example of the extension telephone 3a of the conference promoter, and FIG. 13(b) shows a display example of the extension telephone 3b of the participant A. For the extension telephone 3a of the conference promoter, as shown in FIG. 13(a), the symbol "←→" (i.e., the rightward and leftward arrows) of the communicating state is shown only for the participant A in the display panel 33, but no other participant is displayed. For the extension telephone 3b of the participant A, on the other hand, the symbol "←→" (i.e., the rightward and leftward arrows) is displayed as it is in the display panel 33, as shown in FIG. 13(b), in case the state changes from the bidirectional communications to the secrete communications.

In the changing case from the unidirectional communications to the secret communications, on the other hand, the displayed symbol is charged from the "→" (i.e., the rightward arrow) indicating the unidirectional communications to the "←→" (i.e., the rightward and leftward arrows) like that of the bidirectional communications. The display of the communication state of the extension telephone 3b of the participant A is left as the symbol "←→" (i.e., the rightward and leftward arrows), because the communication state shown at S300 is changed to the secret communications.

Figure 14A:
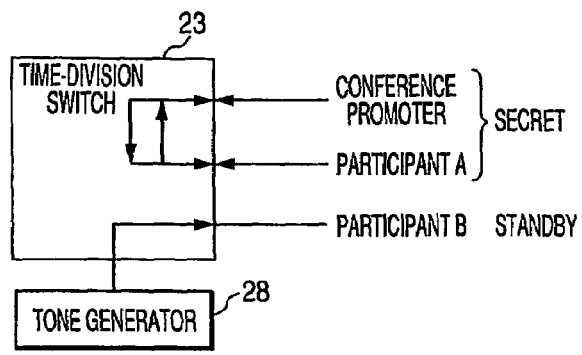
FIG. 14 presents diagrams for explaining the actions of the conference trunk in secret communications.

The controller 26 of the exchange 2 notifies the display of the secret communications of S320, and controls the time-division switch 23 so that the bidirectional communications may be made only between the extension telephone 3a of the conference promoter and the extension telephone 3b of the participant A while making the secret communications which cannot be heard to the extension (i.e., the extension 10b) of another participant (e.g., the participant B). In this meanwhile, the controller 26 acquires the voice message stored in the memory 27 and urging the standby, and transmits that message to another extension (at S330) (as shown in FIG. 14(a)). FIG. 14 presents diagrams for explaining the actions of the conference trunk in the secrete communications, and FIG. 14(a) is a diagram for explaining the relations between the secret communications and the standby. The secret communications between two parties can be realized by the time-division switch so that the conference trunk 25 is not used. The time-division switch is controlled to connect the participant B on standby with either the standby sound source or the standby voice message source of the tone generator 28.

Figure 14B:
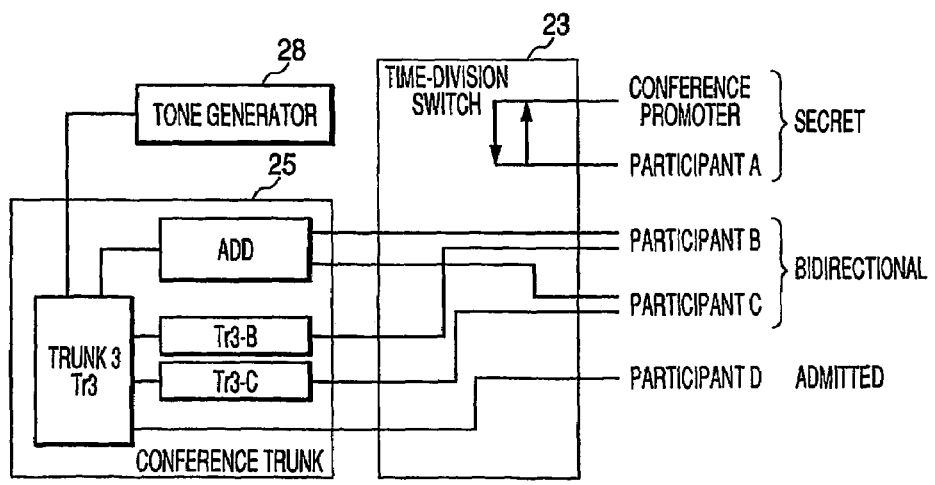

In addition to the voice message urging the standby, the conference may be continued by the remaining participants (at S330, as shown in FIG. 14(b)). FIG. 14(b) is a diagram for explaining the relations among the secret communications, the bidirectional communications and the attendance. It is likely shown in FIG. 14(a) that the secret communications between the conference promoter and the participant A is realized by the time-division switch 23. The description is made on the other participants B, C and D. The bidirectional communications between the participants B and C are realized by the conference trunk 25. At this time, the voice synthesizing signals of the individual participants are fed to the conference trunk 25 so that a trunk (Tr3) is generated. Therefore, the variation of the trunk (Tr3) is described in the following.

If the trunk (Tr3) is generated as the voice synthesization of all the participants B, C and D, the bidirectional communications are realized for all that do not participate in the secret communications. The bidirectional communications are similar to those of FIG. 9(d). Moreover, the participants B and C are synthesized in voices to generate the trunk (Tr3), but the participant D can be made into the Down reception of the trunk (Tr3). The mode is shown in FIG. 14(b), and the participant A and the participant B are in the bidirectional communications whereas the participant C is an attendant, as shown in FIG. 9(c). In place of the trunk (Tr3), the standby holding sound source or the standby voice message source of the tone generator 28 can be fed to make the participant D standby, as in the case of FIG. 14(a).

In the description of the trunk (Tr3) thus far made, it is similar to the contents of the bidirectional communications described with reference to FIG. 8 and FIG. 9 that the synthesized voice signals to be fed to the individual participants for eliminating the physical disorder of the communications are made by subtracting the voices of the participants themselves from the synthesized and added trunk of all.

Here is continuously described the case, in which the conference promoter ends the secret communications with the participant A. The conference promoter pushes the second soft-key 35b, to which the "DISC" of the extension telephone 3a of the conference promoter is assigned. By this press, the information of the press of the second soft-key 35b is notified from the extension telephone 3a to the exchange 2 (as will be abbreviated into the "Secret ending demand") (at S340).

On the display of the display panel 33 of the extension telephone 3a of the conference promoter in the secret communications, the controller 26 of the exchange 2 having received that notification keeps the display of the participant A in the secret communications, in the state of the symbol "←→" (i.e., the rightward and leftward arrows) indicating the bidirectional communications, but again displays the symbol "←→" (i.e., the rightward and leftward arrows) indicating the bidirectional communications, as the display of another participant B. For the extension telephone 3b of the participant A, on the other hand, the controller 26 of the exchange 2 displays the symbol "←→" (i.e., the rightward and leftward arrows) as it is on the display panel 33 (at S350), because the bidirectional communications are changed from the secret communications.

The controller 26 of the exchange 2 controls the time-division switch 23 in the following manner. In order that the conference promoter, the participant A and the participant B may communicate in the conference in the bidirectional communications, the communications among the extension telephone 3a of the conference promoter, the extension telephone 3b of the participant A and the extension telephone of the participant B are inputted to the conference trunk 25. The conference trunk 25 synthesizes the individual input communications and outputs the synthesized communications to the time-division switch 23. The controller 26 controls the time-division switch 23 to form the channels (at S360) so that the synthesized communications outputted from the conference trunk may be individually sent to the extension telephone 3a of the promoter, the extension telephone 3b of the participant A and the extension telephone 3 of the participant B (as referred to S170 of FIG. 8 and FIG. 9(d)). It is also similar to the aforementioned contents that the synthesized voice signals to be fed to the individual participants so as to eliminate the physical disorder of the communications are the synthesized voice signals, which are made by subtracting the voices of the participant themselves from the synthesized and added trunk of all.

Thus, in case the conference promoter wants to make one-by-one communications with the participants in the course of the conference, the promoter can easily select the participant for the secret communications. It is also possible to transfer the communications easily from the bidirectional one to the secret one and vice versa.

The foregoing description of the individual communication modes has been made on the examples, in which the secret communications are made between two parties (i.e., the conference promoter and the participant A) and in which the bidirectional communications are made between the two parties or among the three parties (i.e., the conference promoter and the participant A, or the conference promoter and the participants A and B). The examples are presented just for exemplifying the minimum communication members so as to simplify the description. Therefore, the communication members should not be limited to those of the aforementioned examples. It need not be repeated again that the individual communication modes by more members could be realized by controlling (or by adding or subtracting connections) the time-division switch 23 and the conference trunk 25 in accordance with the description.

(Selection and Cut of Participants by Conference Promoter)

Next, the actions of the exchange 2 of the case, in which the conference promoter selects the participant so that the selected participant may be excluded from the conference, are described with reference to FIG. 15.

Figure 15:
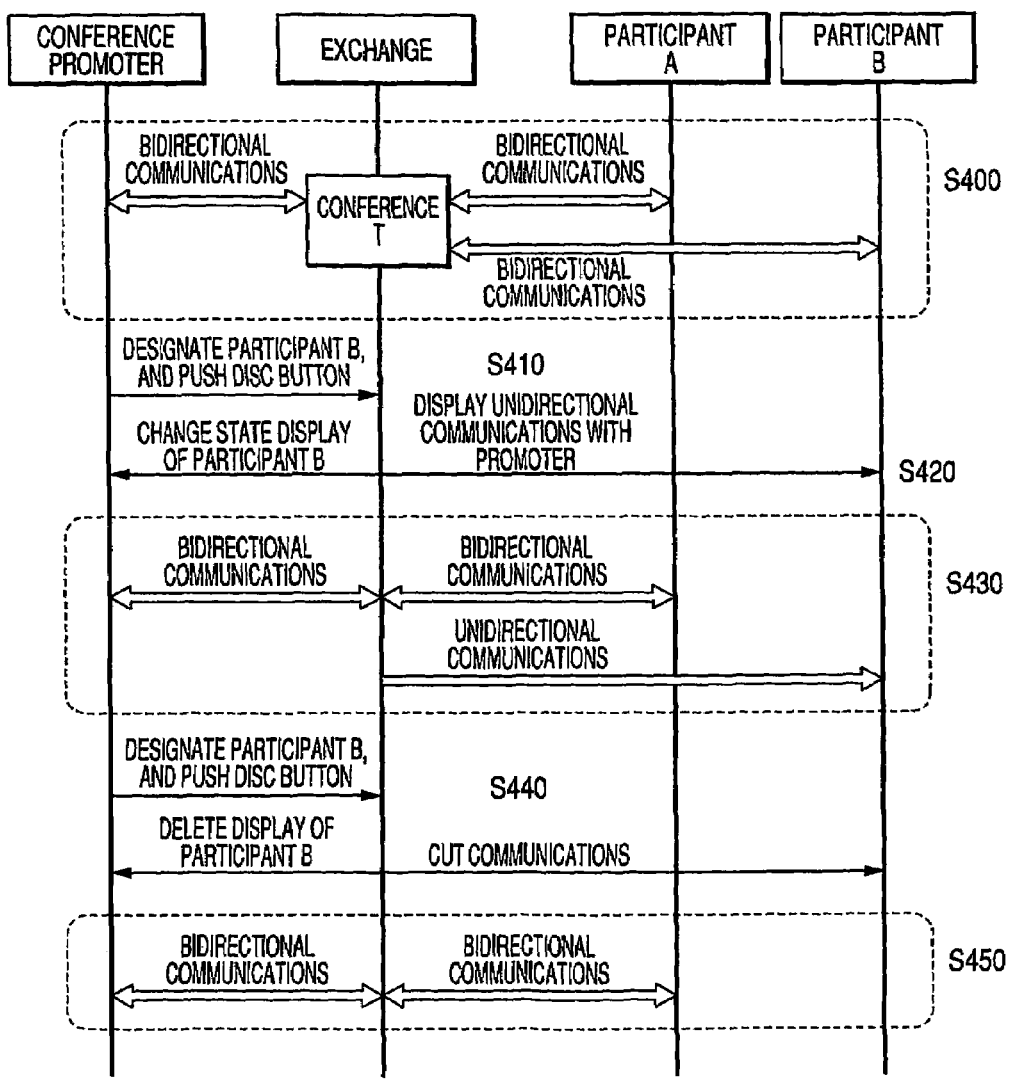
FIG. 15 is a sequence chart for explaining the actions of the exchange.

As shown in FIG. 15, it is assumed (at S400) that the conference promoter, the participant A and the participant B are making the bidirectional conference communications. At S400, the controller 26 of the exchange 2 inputs the communications of the conference promoter, the participant A and the participant B to the conference trunk 25 and synthesizes the voices. After this, the controller 36 controls the channel of the time-division switch 23 so that the synthesized voices may be sent out to them. This state is identical to that shown at S170 of FIG. 8.

In case the conference promoter wants to change the bidirectional communications with the participant B into the unidirectional communications, the promoter selects the participant B from the list of participants displayed in the display panel 33, with the volume-key 38 of the extension telephone 3a, and pushes the "DISC" assigned to the second soft-key 35b. In response to this press, the exchange 2 is notified by the extension telephone 3a of the information on the press of the second soft-key 35b and the extension number of the participant B selected (at S410, as will be abbreviated into the "selection demand").

In response to this notification, the controller 26 of the exchange 2 notifies the extension telephone 3a of the conference promoter and the extension telephone of the participant B, of it on the basis of the extension number of the participant B that the symbol "→" (i.e., the rightward arrow) indicating the unidirectional communications have been done. In response to this notification, the extension telephone 3a of the conference promoter and the extension telephone of the participant B displays the symbol "→" (i.e., the rightward arrow) indicating the unidirectional communications in the communication state of the display panel 33 (at S420).

Notifying the display of the unidirectional communications at S420, the controller 26 of the exchange 2 controls the time-division switch 23 to make unidirectional only the communications between the extension telephone 3a of the conference promoter and the extension telephone of the participant B. The participant B is made unidirectional, the communications between the conference promoter and the participant A are just sent to the participant B. Therefore, the controller 26 can control only the channel of the time-division switch 23 without passing the individual voices to the conference trunk 25 (as referred to S430 to the transition from FIG. 9(d) to FIG. 9(b)).

In case the conference promoter ends the conference communications of the participant B and excludes the participant B from the conference, the promoter selects the participant B from the list of the participants displayed in the display panel 33, with the volume-key 38 of the extension telephone 3a, and pushes the "DISC" assigned to the second soft-key 35b. In response to this press, the exchange 2 is notified by the extension telephone 3a of the information on the press of the second soft-key 35b and the extension number of the participant B selected (at S440, as will be abbreviated into the "exclusion demand").

In response to this notification, on the basis of the extension number of the participant B, the controller 26 of the exchange 2 makes communications to delete the display of the participant B of the display panel 33 of the extension telephone 3a of the conference promoter, and controls the channel of the time-division switch 23 by cutting the extension of the participant B thereby to leave only the bidirectional communications between the conference promoter and the participant A (at S450).

Thus, the bidirectional communication state from the conference promoter to the participant can be designated the communications cut stepwise from the unidirectional communications.

(Leaving of Participants)

Next, the actions of the exchange 2 of the case, in which the participant leaves the conference, are described with reference to FIG. 16.

At first, it is assumed (at S500) that the conference promoter, the participant A and the participant B are speaking in the conference in the bidirectional communications. This state is identical to that of S170 shown in FIG. 8.

Figure 16:
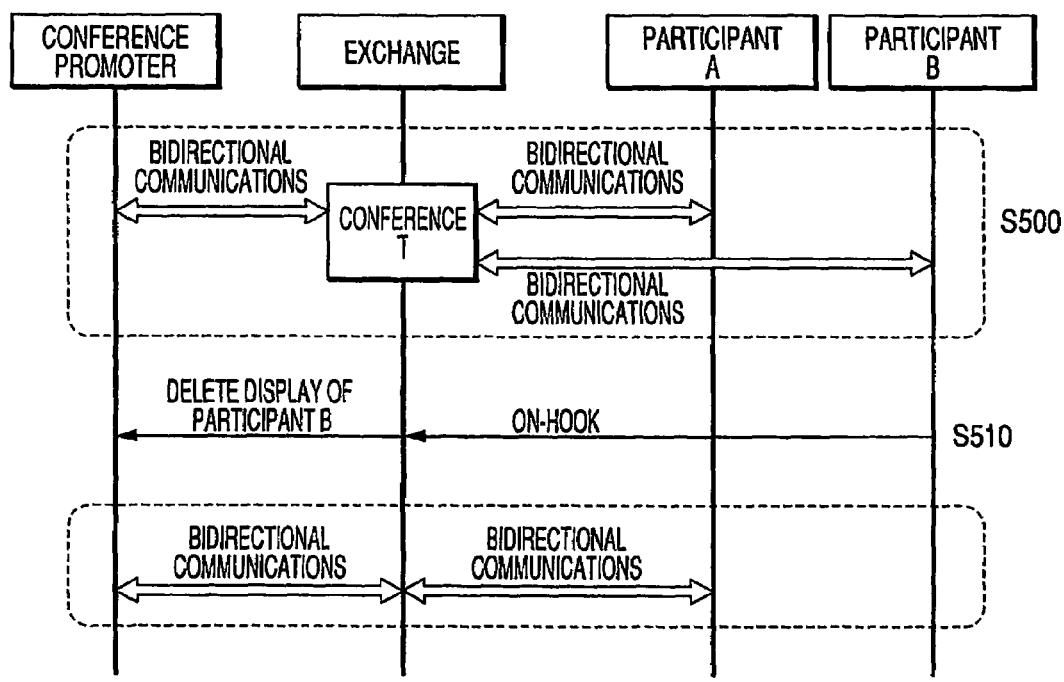
FIG. 16 is a sequence chart for explaining the actions of the exchange.

In case the participant B leaves the conference, as shown in FIG. 16, the hand-set 31 of the extension telephone of the participant B is hooked on the extension telephone body, and this on-hook is notified. In response to the on-hook notification from the extension telephone of the participant B, the exchange 2 transmits the notification indicating the disconnection of the participant B to the conference promoter (at S510).

When the participant B hooks on the extension telephone so that he or she leaves the conference, the controller 26 of the exchange 2 controls the channel of the time-division switch 23 so that the communications may be limited to the bidirectional ones between the conference promoter and the participant A. In this case, too, only the conference promoter and the participant A are making the bidirectional communications as at S140 shown in FIG. 8. It is, therefore, unnecessary to pass the communications through the conference trunk 25. In case the participant is making other bidirectional communications, as not shown in FIG. 16, the controller 26 has to synthesize the voices by passing the bidirectional communications through the conference trunk 25, because three or more persons are making the bidirectional communications as at S500.

Thus, in the ordinary communications, the participant can leave the conference communications by hooking on the extension telephone to break the communications.

In case the conference promoter hooks on (to cut the communications), the conference communications do not hold. Even at any of the steps of unidirectional, bidirectional and secret communications, therefore, the conference communications are ended.

Here, the foregoing description has been made by assuming that the relations between the plural extension telephones are equally handled. In the description, for example, it is assumed that the conference promoter uses one extension telephone 3a (i.e., the first extension telephone), and that the participant A or the like uses another extension telephone.

Considering the case, in which the exchange 2 is utilized in the systematic hierarchy such as an enterprise, the conference promoter can be preset to a specific extension. According to the hierarchy of the conference promoter, moreover, it is possible to preset the members of the group, which is called to the conference (or demanded for the conference). This hierarchy setting can be realized by setting the group which has been described with reference to FIG. 2, and the exchange adapted by the systematic activity can be set. As a result, the individual functions to hold the conference, to make the bidirectional communications and the secret communications, to select the participants and to cut the lines can improve the conveniences of the systematic activities.

The invention can reduce the number of lines for bidirectional communications to be used at conference communications, to the necessary minimum thereby to reduce the conference circuits so that it is suitable for the exchange allowing the plural extension telephones the conference communications.

The invention claimed is:

1. An exchange including a plurality of line interfaces to be connected with a line wire, and one or more extension interfaces to be connected with an extension, for connecting either the line wire and the extension or the extension and another extension, thereby to form a channel, comprising:
   a time-division switch for connecting the line wire and the extension and for forming a channel between each other;
   a memory for grouping at least two telephone numbers of an extension number assigned to the extension and the telephone number of the line wire, into at least one group and for registering the group; and
   a controller for controlling the exchanging action either between the line wire and an extension or between the extensions,
   wherein when said controller receives a conference opening demand for a conference communications via a first extension and a group number, said controller:
   performs a conference calling termination by acquiring the number of other extensions belonging to the same group as that of the first extension having demanded the conference communications, from said memory; and
   controls said time-division switch so as to establish unidirectional communications from the first extension to the other extensions responding to the conference calling termination.

2. The exchange according to claim 1,
wherein said controller controls, in the unidirectional communications when it receives an additional participation demand together with another new extension number via the first extension, a conference calling termination on the demanded extension number.

3. The exchange according to claim 1,
wherein said controller controls, in the unidirectional communications when it receives an excluding demand and one extension number of the other extensions via the first extension, said time-division switch so as to cut the communication with the extension number demanded.

4. The exchange according to claim 1,
wherein said controller performs the conference calling termination and starts a time measurement, and stops, when a predetermined time elapses before the other extension responds, the conference calling termination at the unresponding other extension.

5. The exchange according to claim 1,
wherein said controller transmits, when it controlled the unidirectional communications, a signal for the unidirectional communication display to the first extension and the other extension.

6. The exchange according to claim 1,
wherein the conference calling can terminate not only at the other extension for the conference calling termination but also at the extension.

7. An exchange including a plurality of line interfaces to be connected with a line wire, and one or more extension interfaces to be connected with an extension, for connecting either the line wire and the extension or the extension and another extension, thereby to form a channel, comprising:
   a time-division switch, connecting the line wire and the extension and for forming a channel between each other;
   a conference trunk for synthesizing voices;
   a memory for grouping at least two telephone numbers of an extension number assigned to the extension and the telephone number of the line wire, into at least one group and for registering the group; and
   a controller, controlling the exchanging action either between the line wire and the extension or between the extensions,
   wherein when said controller receives a conference opening demand together with a group number for a conference communications via a first extension and the group number, said controller:
   performs a conference calling termination by acquiring the number of other extensions belonging to the same group as that of the first extension having demanded the conference communications, from said memory; and
   controls said time-division switch so as to establish unidirectional communications from the first extension to the other extensions responding to the conference calling termination, and
   wherein said controller further controls, when it receives a demand for bidirectional communications from any extension for the unidirectional communications, said time-division switch so that the extension having demanded the bidirectional communications and the first extension may make bidirectional communications.

8. The exchange according to claim 7,
wherein, in case the bidirectional communication demand was made from the other extension, the control of said bidirectional communications is made after a response of approval was received from the first extension.

9. The exchange according to claim 7,
wherein said controller controls said conference trunk in addition to said time-division switch to perform the bidirectional communications, and transmits the signal synthesized by said conference trunk, as a reception voice to the other extension not participating in the bidirectional communications, so that the other extension not participating in the bidirectional communications can be attended.

10. The exchange according to claim 7,
wherein said controller controls, in the bidirectional communications when it receives an additional participation demand and another new extension number via the first extension, a conference calling termination on the demanded extension number.

11. The exchange according to claim 10,
wherein said controller performs the conference calling termination and starts a time measurement, and stops, when a predetermined time elapses before the other extension responds, the conference calling termination at the unresponding other extension.

12. The exchange according to claim 7,
wherein said controller controls, in the bidirectional communications when it receives a selecting demand together with one extension number of the other extensions via the first extension, said time-division switch so that the demanded extension number may change from said bidirectional communications to the unidirectional communication.

13. The exchange according to claim 7,
wherein said controller controls, in the unidirectional communications when it receives an excluding demand and one extension number of the other extensions via the first extension, said time-division switch so as to cut the communication with the extension number demanded.

14. The exchange according to claim 7,
wherein said controller performs the conference calling termination and starts a time measurement, and stops, when a predetermined time elapses before the other extension responds, the conference calling termination at the unresponding other extension.

15. The exchange according to claim 7,
wherein said controller transmits, when it controlled the unidirectional communications, a signal for the unidirectional communication display to the first extension and the other extension.

16. The exchange according to claim 7,
wherein said controller transmits, when it controlled the bidirectional communications, a signal for said bidirectional communication display to the first extension and the other extension.

17. The exchange according to claim 7,
wherein the conference calling can terminate not only at the other extension for the conference calling termination but also at the line wire.

18. The exchange including a plurality of line interfaces to be connected with a line wire, and one or more extension interfaces to be connected with an extension, for connecting either the line wire and the extension or the extension and another extension, thereby to form a channel, comprising:
a time-division switch for connecting the line wire and the extension and for forming a channel between each other;
a conference trunk for synthesizing voices;
a memory for grouping at least two telephone numbers of an extension number assigned to the extension and the telephone number of the line wire, into at least one group and for registering the group; and
a controller for controlling the exchanging action either between the line wire and the extension or between the extensions,
wherein when said controller receives a conference opening demand together with a group number for a conference communications via a first extension, said controller:
performs a conference calling termination by acquiring the number of other extensions belonging to the same group as that of the first extension having demanded the conference communications, from said memory; and
controls said time-division switch so as to establish unidirectional communications from the first extension to the other extensions responding to the conference calling termination,
wherein said controller controls, when it receives a demand for bidirectional communications from any extension for the unidirectional communications, said time-division switch and said conference trunk so that the extension having demanded the bidirectional communications and the first extension may make bidirectional communications, and
wherein in the bidirectional communications among three or more of the first extension and the other extensions, said controller controls, when it selects the extension for a secret from the extensions of the bidirectional communications and receives a secret communication demand via the first extension, said time-division switch for a secret communications so that only the extension selected and the first extension.

19. The exchange according to claim 18,
wherein said controller further includes a tone generator and controls said time-division switch and said tone generator for transmitting a standby holding sound from said tone generator to the other extension which has been controlled from the bidirectional communications to a control not to participate in the secret communications.

20. The exchange according to claim 18,
wherein said controller: controls said conference trunk in addition to said time-division switch to perform the bidirectional communications; transmits the signal synthesized by said conference trunk, as a reception voice between the other extensions controlled not to participate in the secret communications from said bidirectional communications; and
makes the bidirectional communications between the other extensions, which are controlled from the bidirectional communications to the control not to participate in the secret communications.

21. The exchange according to claim 18,
wherein said controller controls, in the secret communications when it receives a secret ending demand via the first extension, said time-division switch and said conference trunk so that the bidirectional communications may be made again between the extensions having made the bidirectional communications.

22. A conference communication method for an exchange including a plurality of line interfaces to be connected with a line wire, and one or more extension interfaces to be connected with an extension, for connecting either the line wire and the extension or the extension and the extension, thereby to form a channel, wherein another exchange includes:
a time-division switch for connecting the line wire and the extension and for forming a channel between each other;
a conference trunk for synthesizing voices;
a memory for grouping at least two telephone numbers of an extension number assigned to the extension and the telephone number of the line wire, into at least one group and for registering the group; and
a controller for controlling the exchanging action either between the line wire and the extension or between the extensions,
wherein said controller comprises: a conference opening demanding step of receiving a conference opening demand via a first extension and the group number; a conference calling termination step of performing a conference calling termination by acquiring the number of other extensions belonging to the same group as that of the first extension having demanded a conference communications, from said memory; and a unidirectional communication step of controlling said time-division switch so as to establish unidirectional communications from the first extension to the other extensions responding to the conference calling termination, and wherein said controller further comprises: a bidirectional communication demanding step of receiving a demand for bidirectional communications from any extension for the unidirectional communications; a bidirectional communication step of controlling said time-division switch and said conference trunk so that the extension having demanded the bidirectional communications and the first extension may make bidirectional communications; and an attending step of transmitting a signal synthesized by said conference trunk, as a reception voice to the other extension not participating in the bidirectional communications, so that the other extension not participating in the bidirectional communications can be attended.

* * * * *